(12) United States Patent
Cornelissen et al.

(10) Patent No.: US 12,161,249 B2
(45) Date of Patent: Dec. 10, 2024

(54) SYSTEM FOR PREPARING A BEVERAGE

(71) Applicant: KONINKLIJKE DOUWE EGBERTS B.V., Utrecht (NL)

(72) Inventors: Marjan Cornelissen, Drachten (NL); Klaas Kooijker, Drachten (NL); Judith Margreet Hanneke Ogink, Putten (NL); Peter Rijskamp, Gaggio Montano (IT); Jarno Beekman, Drachten (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 1099 days.

(21) Appl. No.: 16/265,945

(22) Filed: Feb. 1, 2019

(65) Prior Publication Data

US 2019/0335939 A1   Nov. 7, 2019

Related U.S. Application Data

(63) Continuation of application No. PCT/NL2017/050511, filed on Aug. 3, 2017.

(30) Foreign Application Priority Data

Aug. 3, 2016  (NL) ...................................... 2017280

(51) Int. Cl.
*A47J 31/36* (2006.01)
*A47J 31/06* (2006.01)
*B65D 85/804* (2006.01)

(52) U.S. Cl.
CPC ....... *A47J 31/3633* (2013.01); *A47J 31/0642* (2013.01); *B65D 85/8043* (2013.01)

(58) Field of Classification Search
CPC ............... B65D 85/8043; B65D 85/804; A47J 31/0642; A47J 31/0647; A47J 31/0673; A47J 31/3633; A47J 31/06; A47J 31/36
See application file for complete search history.

(56) References Cited

U.S. PATENT DOCUMENTS 4,775,048 A   10/1988  Baecchi
4,787,299 A   11/1988  Levi
(Continued)

FOREIGN PATENT DOCUMENTS

AU   2012356914   7/2014
AU   2013305155   3/2015
(Continued)

OTHER PUBLICATIONS

International Search Report and Written Opinion, PCT/NL2017/050509, 11 pages (Jun. 5, 2018).
(Continued)

*Primary Examiner* — Dana Ross
*Assistant Examiner* — Adam M Eckardt
(74) *Attorney, Agent, or Firm* — Fitch, Even, Tabin & Flannery LLP

(57) ABSTRACT

A beverage preparation system comprises a first exchangeable capsule with a first exit face and a second exchangeable capsule with a second exit face, the second exit face having a larger diameter than the first exit face. The system further comprises an apparatus including an extraction plate having a plurality of relief elements for selectively engaging one of the first and second exit faces, and a fluid dispensing device for supplying an amount of fluid under pressure to a selected one of the exchangeable capsules, so as to press its exit face onto the relief elements, for opening the exit face. The extraction plate and the second exit face are adapted to each other such that a flow resistance of the second exit face when opened is less than a flow resistance of the first exit face when opened.

18 Claims, 20 Drawing Sheets

(56) References Cited

U.S. PATENT DOCUMENTS

| | | |
|---|---|---|
| 5,197,374 A | 3/1993 | Fond |
| 5,343,799 A | 9/1994 | Fond |
| 5,964,142 A | 10/1999 | Tio |
| 6,026,732 A | 2/2000 | Kollep |
| 7,216,582 B2 | 5/2007 | Yoakim |
| 7,337,704 B2 | 3/2008 | Hammad |
| 7,607,385 B2 | 10/2009 | Halliday |
| 8,210,096 B2 | 7/2012 | Fin |
| 8,365,585 B2 | 2/2013 | Barra |
| 8,770,095 B2 | 7/2014 | Pecci |
| 8,836,956 B2 | 9/2014 | Jarisch |
| 8,904,922 B2 | 12/2014 | Pagano |
| 9,167,934 B2 | 10/2015 | Höglauer et al. |
| 9,186,018 B2 | 11/2015 | Rotta |
| 9,439,532 B2 | 9/2016 | Crarer |
| 9,801,494 B2 | 10/2017 | Castellani |
| 9,986,869 B2 | 6/2018 | Bonacci |
| 2001/0011502 A1 | 8/2001 | Bonanno |
| 2001/0052294 A1 | 12/2001 | Schmed |
| 2002/0023543 A1 | 2/2002 | Schmed |
| 2003/0066431 A1 | 4/2003 | Fanzutti |
| 2004/0197444 A1 | 10/2004 | Halliday |
| 2005/0223904 A1 | 10/2005 | Laigneau |
| 2006/0075902 A1 | 4/2006 | Magno |
| 2006/0107841 A1 | 5/2006 | Schifferle |
| 2006/0174769 A1 | 8/2006 | Favre |
| 2006/0266224 A1 | 11/2006 | Hammad |
| 2008/0006159 A1 | 1/2008 | Fischer |
| 2008/0245236 A1 | 10/2008 | Ternite |
| 2010/0064899 A1* | 3/2010 | Aardenburg ........ A47J 31/3638 83/660 |
| 2011/0000377 A1 | 1/2011 | Favre |
| 2011/0142996 A1 | 6/2011 | Krueger |
| 2011/0183055 A1 | 7/2011 | Mariller |
| 2011/0185910 A1 | 8/2011 | Ryser |
| 2011/0277642 A1 | 11/2011 | Mariller |
| 2011/0297005 A1 | 12/2011 | Mariller |
| 2012/0240779 A1 | 9/2012 | Perentes |
| 2013/0099597 A1 | 4/2013 | Perentes |
| 2013/0220138 A1 | 8/2013 | Deuber |
| 2013/0247774 A1 | 9/2013 | Macchiavelli |
| 2013/0323366 A1 | 12/2013 | Gerbaulet |
| 2014/0053734 A1 | 2/2014 | Santi |
| 2014/0227414 A1 | 8/2014 | Perentes |
| 2014/0263780 A1 | 9/2014 | Day, Jr. |
| 2014/0290495 A1 | 10/2014 | Perentes |
| 2014/0299000 A1 | 10/2014 | Hanneson |
| 2015/0027375 A1 | 1/2015 | Cha |
| 2015/0059587 A1* | 3/2015 | Colleoni ............. A47J 31/3638 99/295 |
| 2015/0082989 A1 | 3/2015 | Besson |
| 2015/0104550 A1 | 4/2015 | Oh |
| 2015/0147448 A1 | 5/2015 | Lo Foro |
| 2015/0157169 A1 | 6/2015 | Krüger |
| 2015/0158665 A1 | 6/2015 | Krüger |
| 2015/0183577 A1 | 7/2015 | Talon |
| 2015/0225169 A1 | 8/2015 | Jarisch |
| 2015/0238039 A1 | 8/2015 | Fischer |
| 2015/0272375 A1* | 10/2015 | Flick .................. A47J 31/0647 99/295 |
| 2015/0272376 A1 | 10/2015 | Flick |
| 2015/0272380 A1 | 10/2015 | Flick |
| 2015/0342394 A1 | 12/2015 | Bonacci et al. |
| 2016/0045060 A1 | 2/2016 | Flick |
| 2016/0150907 A1 | 6/2016 | Bolognese et al. |
| 2016/0157666 A1 | 6/2016 | Brandsma |
| 2016/0309946 A1 | 10/2016 | Gunstone |
| 2017/0143157 A1 | 5/2017 | Tentorio |
| 2019/0167031 A1 | 6/2019 | Rijskamp |
| 2019/0274467 A1 | 9/2019 | Ogink |
| 2019/0335940 A1 | 11/2019 | Rijskamp |
| 2019/0335942 A1 | 11/2019 | Rijskamp |
| 2019/0343324 A1 | 11/2019 | Rijskamp |
| 2019/0343325 A1 | 11/2019 | Ogink |
| 2020/0000265 A1 | 1/2020 | Ogink |
| 2020/0000268 A1 | 1/2020 | Ogink |
| 2020/0000271 A1 | 1/2020 | Ogink |

FOREIGN PATENT DOCUMENTS

| | | |
|---|---|---|
| CA | 2765324 | 11/2010 |
| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 A | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1 208 782 A1 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 1859714 B1 | 11/2007 |
| EP | 2033551 | 3/2009 |
| EP | 2071986 | 6/2009 |
| EP | 2071987 | 6/2009 |
| EP | 2230195 A1 | 9/2010 |
| EP | 2250950 | 11/2010 |
| EP | 2374383 B1 | 11/2011 |
| EP | 2409608 | 1/2012 |
| EP | 2409609 | 1/2012 |
| EP | 2471420 | 7/2012 |
| EP | 2656755 | 10/2013 |
| EP | 2687133 | 1/2014 |
| EP | 2 833 766 B1 | 2/2015 |
| JP | H5192246 A | 8/1993 |
| JP | 2006528507 A | 12/2006 |
| JP | 2009531099 A | 9/2009 |
| JP | 2014138892 | 7/2014 |
| JP | 2015506787 A | 3/2015 |
| JP | 2015512739 A | 4/2015 |
| RU | 2012128493 A | 1/2014 |
| RU | 2591768 C2 | 7/2016 |
| RU | 2626940 | 8/2017 |
| WO | 2000042891 | 7/2000 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007012206 | 2/2007 |
| WO | 2007016977 | 2/2007 |
| WO | 2007096196 | 8/2007 |
| WO | 2007113100 | 10/2007 |
| WO | 2007122206 | 11/2007 |
| WO | 2008004116 | 1/2008 |
| WO | 2008096385 | 8/2008 |

(56) References Cited

FOREIGN PATENT DOCUMENTS

| | | |
|---|---|---|
| WO | 2009016455 | 2/2009 |
| WO | 2009027131 | 3/2009 |
| WO | 2010013274 | 2/2010 |
| WO | 2010029512 | 3/2010 |
| WO | 2010076698 | 7/2010 |
| WO | 2010134054 | 11/2010 |
| WO | 2010137953 | 12/2010 |
| WO | 2010137954 | 12/2010 |
| WO | 2010137956 | 12/2010 |
| WO | 2011015978 | 2/2011 |
| WO | WO-2011/042401 A2 | 4/2011 |
| WO | 2011069830 | 6/2011 |
| WO | 2011073310 | 6/2011 |
| WO | 2011076750 | 6/2011 |
| WO | WO-2011/069829 A1 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | 2013092910 | 6/2013 |
| WO | WO-2013/079814 A1 | 6/2013 |
| WO | 2013119543 | 8/2013 |
| WO | 2013144922 | 10/2013 |
| WO | 2014012778 | 1/2014 |
| WO | 2014012779 | 1/2014 |
| WO | 2014016741 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056810 | 4/2014 |
| WO | 2014056821 | 4/2014 |
| WO | 2014060370 | 4/2014 |
| WO | WO-2014/056730 A1 | 4/2014 |
| WO | WO-2014/056862 A1 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082663 | 6/2015 |
| WO | 2015082664 | 6/2015 |
| WO | 2015086371 | 6/2015 |
| WO | WO-2015/082662 A1 | 6/2015 |
| WO | WO-2015/109052 A1 | 7/2015 |
| WO | 2015124627 | 8/2015 |
| WO | 2015158838 | 10/2015 |
| WO | WO-2015/144356 A1 | 10/2015 |
| WO | WO-2015/155145 A1 | 10/2015 |
| WO | WO-2015/173123 A1 | 11/2015 |
| WO | WO-2015/193744 A1 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Search Report and Written Opinion, PCT/NL2017/050510, 10 pages (Nov. 20, 2017).
International Search Report and Written Opinion, PCT/NL2017/050511, 9 pages (Nov. 30, 2017).
International Search Report and Written Opinion, PCT/NL2017/050512, 10 pages (Nov. 27, 2017).
International Search Report and Written Opinion, PCT/NL2017/050513, 8 pages (Dec. 22, 2017).
International Search Report and Written Opinion, PCT/NL2017/050514, 8 pages (Nov. 23, 2017).
International Search Report and Written Opinion, PCT/NL2017/050515, 10 pages (Nov. 27, 2017).
International Search Report and Written Opinion, PCT/NL2017/050519, 11 pages (Nov. 29, 2017).
International Search Report and Written Opinion, PCT/NL2017/050521, 8 pages (Dec. 4, 2017).
International Search Report and Written Opinion, PCT/NL2017/050522, 17 pages (Jan. 17, 2018).
International Preliminary Report on Patentability, PCT/NL2017/050509, 7 pages (Feb. 5, 2019).
International Preliminary Report on Patentability, PCT/NL2017/050510, 7 pages (Feb. 5, 2019).
International Preliminary Report on Patentability, PCT/NL2017/050511, 7 pages (Feb. 5, 2019).
International Preliminary Report on Patentability, PCT/NL2017/050512, 6 pages (Feb. 5, 2019).
International Preliminary Report on Patentability, PCT/NL2017/050513, 6 pages (Feb. 5, 2019).
International Preliminary Report on Patentability, PCT/NL2017/050514, 6 pages (Feb. 5, 2019).
International Preliminary Report on Patentability, PCT/NL2017/050515, 6 pages (Feb. 5, 2019).
International Preliminary Report on Patentability, PCT/NL2017/050519, 9 pages (Feb. 5, 2019).
International Preliminary Report on Patentability, PCT/NL2017/050521, 5 pages (Feb. 5, 2019).
International Preliminary Report on Patentability, PCT/NL2017/050522, 12 pages (Feb. 5, 2019).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).

\* cited by examiner

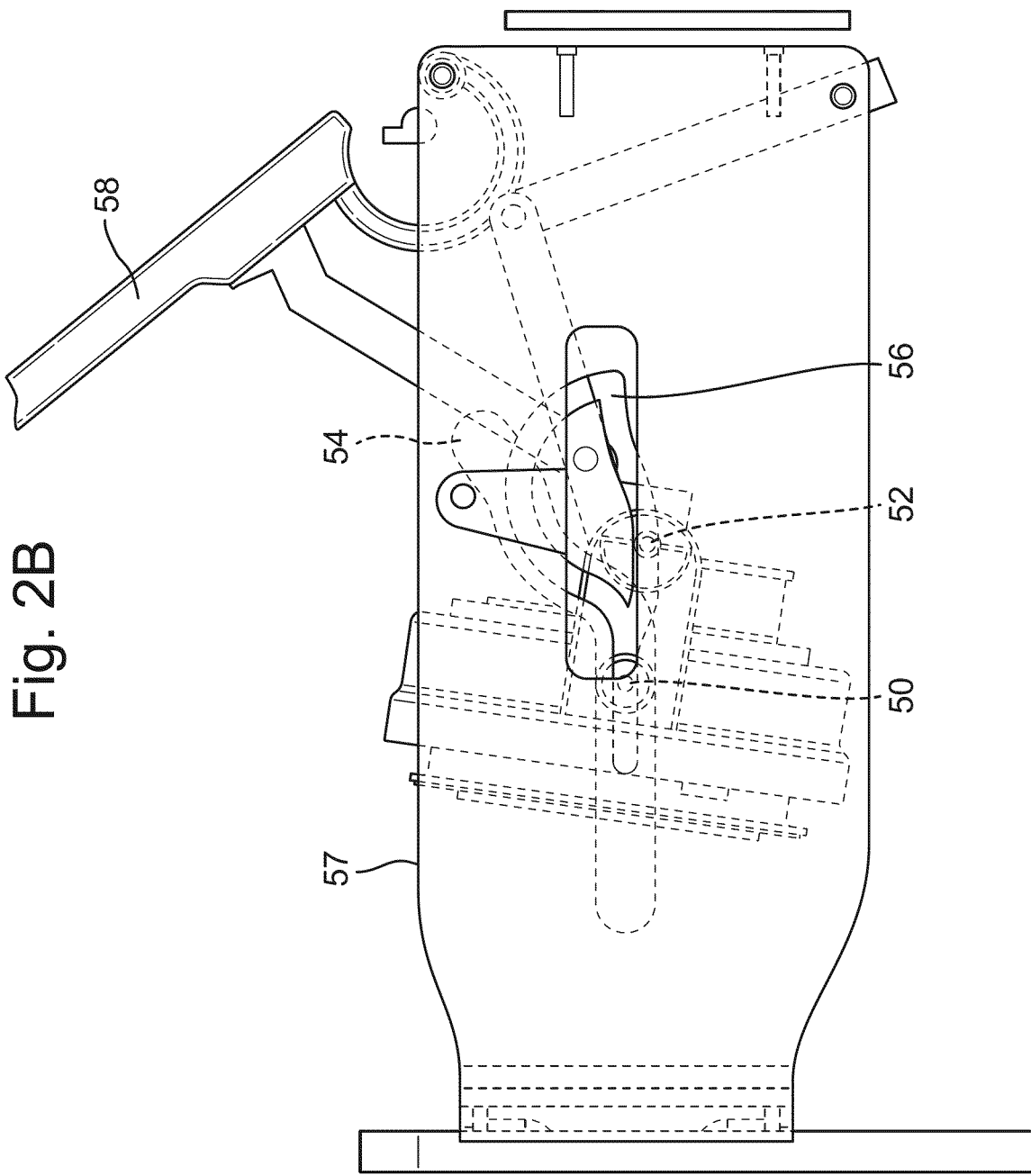

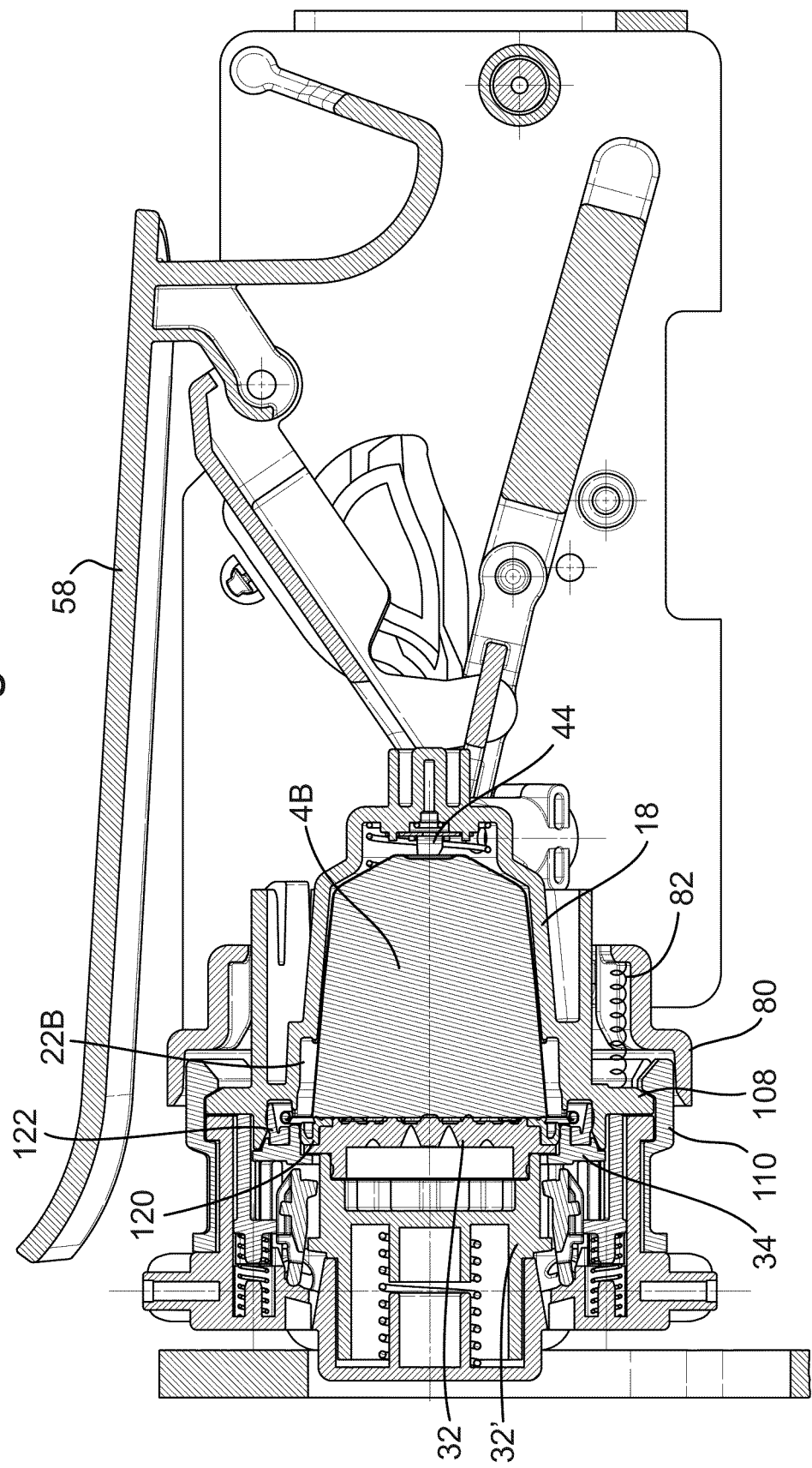

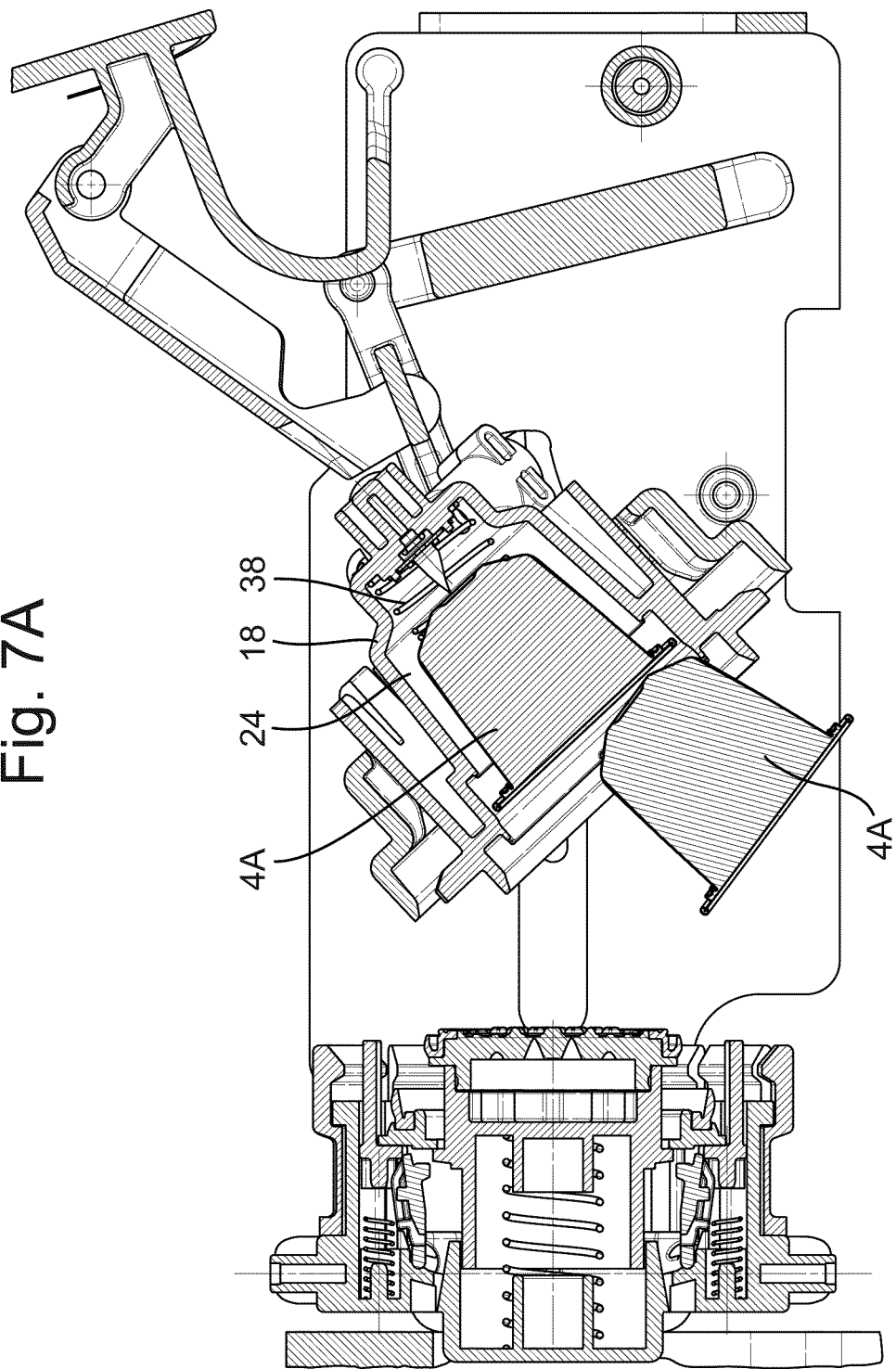

SYSTEM FOR PREPARING A BEVERAGE

CROSS-REFERENCE TO RELATED APPLICATIONS

This application is a continuation of International Application No. PCT/NL2017/050511 filed Aug. 3, 2017, which claims the benefit of and priority to Netherlands Patent Application No. NL 2017280 filed Aug. 3, 2016, the entire contents of each of which are hereby incorporated herein by reference.

BACKGROUND

The invention generally relates to a system for preparing a beverage. The invention also relates to an apparatus and method for preparing a beverage. More specifically the invention relates to a system for preparing a beverage using a capsule.

Capsule-based beverage preparing systems are very popular nowadays, not only because of the ease of use of these systems, but also because of the highly increased quality of the beverages prepared thereby.

To serve the many various consumers, broad ranges of beverages should be available in terms of ingredient composition and/or intensity and/or quantity, and/or the like, of such a beverage.

Accordingly, there is an evident and continuing general desire for a capsule-based beverage preparing system, which provides ever broader ranges of beverages that can be prepared by one and the same apparatus of such a system, with high beverage quality throughout all said ever broader ranges.

SUMMARY

It is an object of the invention to provide a solution according to which broad ranges of beverages can be prepared by one and the same apparatus of a capsule-based beverage preparing system, with high beverage quality throughout said broad ranges.

For that purpose, the invention provides a system according to the appended independent claim 1.

Preferable embodiments of the invention are provided by the appended claims.

Accordingly, the invention provides a system for preparing a quantity of beverage suitable for consumption, including an optional first exchangeable capsule with a first exit face and a second exchangeable capsule with a second exit face, the second exit face having a larger diameter than the first exit face. The system includes an apparatus including an extraction plate having a plurality of relief elements for selectively engaging one of the first and second exit faces, and a fluid dispensing device for supplying an amount of fluid, such as water, under pressure to a selected one of the exchangeable capsules, so as to press its exit face onto the relief elements, for opening the exit face.

Hence, the system according to the invention has an apparatus by which beverages can selectively be prepared from said first exchangeable capsule or said second exchangeable capsule. Since the first and second capsules mutually differ at least in the diameter sizes of their first and second exit faces, respectively, the same apparatus can process differently sized capsules. Thanks to this, the apparatus is arranged for preparing broader ranges of beverages in terms of ingredient composition and/or intensity and/or quantity, and/or the like, of such a beverage, as compared to an apparatus which can only process capsules of substantially one size.

According to an aspect the apparatus comprises a first brew chamber part having a cavity for selectively holding one of the first and second exchangeable capsules, and a second brew chamber part for closing the first brew chamber part around the first or second capsule.

Optionally, the cavity of the first brew chamber part is a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part.

Optionally, the second brew chamber part has the extraction plate for abutting against the first or second exit face, the extraction plate including a central portion and a peripheral portion. Optionally, the central portion is movable relative to the peripheral portion in a movement direction, which preferably is an at least partially axial movement direction.

Optionally, the extraction plate includes relief elements of a first type and one or more relief element of a second type. Optionally, the relief elements of the first type are arranged on the central portion. Optionally, the relief elements of the second type are arranged on the central portion. Optionally, the relief elements of the second type are arranged to surround the relief elements of the first type.

Optionally, the relief elements of the first type are arranged within a substantially square area on the central portion. The relief elements of the second type can be positioned outside the substantially square area, e.g. in substantially circle-segment shaped areas, on the central portion.

Optionally, the relief elements of the second type have a sharper edge than the relief elements of the first type. For instance, a radius of curvature of an edge of the relief element of the second type, can be smaller than a radius of curvature of an edge of the relief element of the first type.

Optionally, the relief elements of the second type have a sharper edge than the relief elements of the first type, the relief elements of the second type surrounding the relief elements of the first type, wherein preferably the relief elements of the first and second type both are arranged on the central portion, e.g. the relief elements of the first type within the substantially square area. This can provide more even piercing of the exit area of the first and/or second capsule, than when the relief elements of the second type are arranged to have edges that are as sharp or more blunt than the relief elements of the first type. Also this can aid in having the relief elements outside the substantially square area pierce the exit area of the first and/or second capsule. It will be appreciated that piercing of the exit area can be obtained under the effect of fluid pressure inside the capsule pressing the exit area against the relief elements.

Optionally, one or more of the relief elements are positioned on the central portion. Optionally, one or more of the relief elements are positioned on the peripheral portion. Optionally, all relief elements are positioned on the central portion. Optionally, one or more of the outer relief elements are positioned on the central portion. Optionally, one or more of the relief elements of the first type are positioned on the central portion. Optionally, all relief elements of the first type are positioned on the central portion. Optionally, one or more of the relief elements of the second type are positioned on the central portion. Optionally, all relief elements of the second type are positioned on the central portion. Optionally, one or more of the relief elements of the second type are positioned on the peripheral portion. Optionally, all relief elements of the second type are positioned on the peripheral portion. Optionally, the peripheral portion is free from relief elements.

Optionally, the extraction plate and the second exit face are adapted to each other such that a flow resistance of the second exit face when opened is less than a flow resistance of the first exit face when opened. Speaking in relative terms between the first and second capsules, respectively, this can mean that the first exit face of the first capsule has a "smaller diameter" in combination with a "higher flow resistance" when the first exit face has been opened, while the second exit face of the second capsule has a "larger diameter" in combination with a "lower flow resistance" when the second exit face has been opened. Thanks to this, it is possible to generally obtain improved qualities of the various possible beverages preparable from not only the first capsules but also the second capsules, as compared to a situation in which a flow resistance of the opened larger-diameter second exit face of the second capsule would be the same or higher than that of the opened smaller-diameter first exit face of the first capsule. The reason is that for a considered reference beverage "X" to be prepared from the first and second capsules, the larger-diameter second exit face of the second capsule, by virtue of its larger diameter, in itself already can lead to a so-to-say "intrinsically" decreased flow resistance of the opened second exit face as compared to the smaller-diameter first exit face of the first capsule. Then, supposing that the beverage extraction using the first capsule with its smaller-diameter first exit face would have been optimized as to a desired quality of the reference beverage X, the flow resistance of the opened larger-diameter second exit face needs to be reduced in order to compensate for said intrinsically increased flow resistance due to the larger-diameter second exit face, in order to also optimize the beverage extraction using the second capsule with the larger-diameter second exit face as to the desired quality of the reference beverage X.

According to an aspect the extraction plate and the second exit face are adapted to each other such that the second exit face tears on the extraction plate over a larger surface area than the first exit face. That the second exit face tears on the extraction plate over a larger surface area than the first exit face, provides an effective, reliable and non-complex realisation of the abovementioned more general feature of the present invention that a flow resistance of the second exit face when opened is less than a flow resistance of the first exit face when opened.

According to an aspect the extraction plate and the second exit face are adapted to each other such that the second exit face tears on the extraction plate on more locations than the first exit face. That the second exit face tears on the extraction plate on more locations than the first exit face, provides a further, i.e. alternative or additional, effective, reliable and non-complex realisation of the abovementioned more general feature of the present invention that a flow resistance of the second exit face when opened is less than a flow resistance of the first exit face when opened.

According to an aspect outer relief elements are designed for tearing both the first and second exit face wherein the second exit face tears on the outer relief elements over a larger surface area than the first exit face. These outer relief elements provide a further, i.e. alternative or additional, effective, reliable and non-complex realisation of the abovementioned more general feature of the present invention that a flow resistance of the second exit face when opened is less than a flow resistance of the first exit face when opened.

According to an aspect the extraction plate includes relief elements of the first type and at least one relief element of the second type. Optionally the relief elements of the first type are arranged within an area corresponding to the first exit face, and the at least one relief element of the second type being arranged within an area corresponding to the second exit face and outside the area corresponding to the first exit face. Alternatively, or additionally, one or more relief elements of the second type are arranged within the area corresponding to the first exit face. These relief elements of the first and second types provide a further, i.e. alternative or additional, effective, reliable and non-complex realisation of the abovementioned more general feature of the present invention that a flow resistance of the second exit face when opened is less than a flow resistance of the first exit face when opened.

According to an aspect the relief element of the second type has a sharper edge than the relief elements of the first type. Thanks to this sharper edge the second exit face may tear on the at least one relief element of the second type earlier than on the relief elements of the first type. For example, the second exit face may tear earlier in its outer ranges than in its inner ranges. This contributes substantially to the aim of obtaining an extraction process being as much as possible uniformly distributed throughout the entire inner space of the second capsule, which is favourable for the quality of the prepared beverage.

According to an aspect the second exit face includes a weakened zone. These weakened zones provide a further, i.e. alternative or additional, effective, reliable and non-complex realisation of the abovementioned more general feature of the present invention that a flow resistance of the second exit face when opened is less than a flow resistance of the first exit face when opened. Such weakened zones may be realized in many various ways, for example by means of pre-cut zones (lasered or otherwise), strip lamination, embossing, die cutting, knurling (between two embossing rolls), printing stiffness zones on a thin aluminum base, applying thin aluminum foil on woven web, peel seals, etc.

According to an aspect the weakened zone is located in a peripheral area of the second exit face. Locating the weakened zones in a peripheral area of the second exit face provides a further, i.e. alternative or additional, effective, reliable and non-complex realisation of the abovementioned more general feature of the present invention that a flow resistance of the second exit face when opened is less than a flow resistance of the first exit face when opened.

Optionally a sealing surface for sealing against the second exit face is provided at the peripheral portion. Optionally, a sealing surface for sealing against the first exit face is provided at the central portion.

According to an aspect the central portion may include a first sealing member arranged for providing a, e.g. self-reinforcing, fluid sealing engagement between the central portion and the peripheral portion when forming the brew chamber for holding the second exchangeable capsule. Optionally, the peripheral portion can include a second sealing member arranged for providing a, e.g. self-reinforcing, fluid sealing engagement between the peripheral portion and the first brew chamber part when forming the brew chamber for holding the second exchangeable capsule. Optionally, the first sealing member is arranged for providing a, e.g. self-reinforcing, fluid sealing engagement between the central portion and first brew chamber part when forming the brew chamber for holding the first exchangeable capsule. The first sealing member may be arranged for sealing against the first exit face. The first sealing member may be arranged for sealing against the second exit face. The second sealing member may be arranged for sealing against the first exit face.

According to an aspect is provided an apparatus of the system as described herein.

According to an aspect is provided a method for preparing a quantity of beverage suitable for consumption as described herein.

According to an aspect is provided a capsule, and a set of a first and second capsule as described herein.

It will be appreciated that any of the embodiments, aspects, features and options described in view of the system apply equally to the apparatus, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

It is noted that the principles of the invention according to the appended independent claim 1 and the appended dependent claims 2-5 are best illustrated by FIGS. 9A-9D, 10A-10D, 11A-11D of the drawings.

Figure 1A:
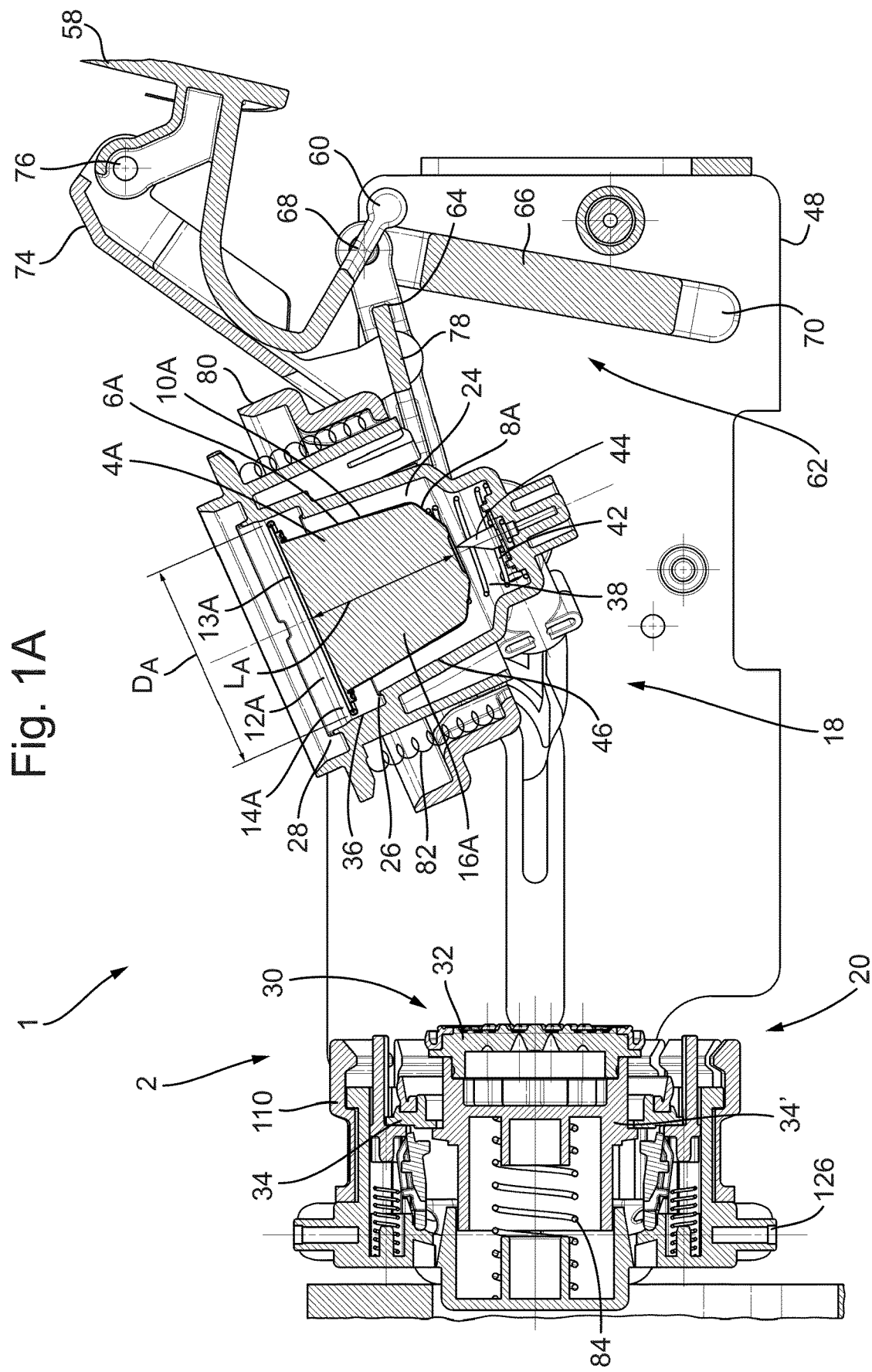

The principles of the invention according to the appended dependent claims 6-12 are best illustrated by FIGS. 1A-1B, 2A-2B, 3A-3B, 4A-4B, 5A-5C, 6A-6B, 7A-7B, and 8A-8B of the drawings.

Figure 1B:
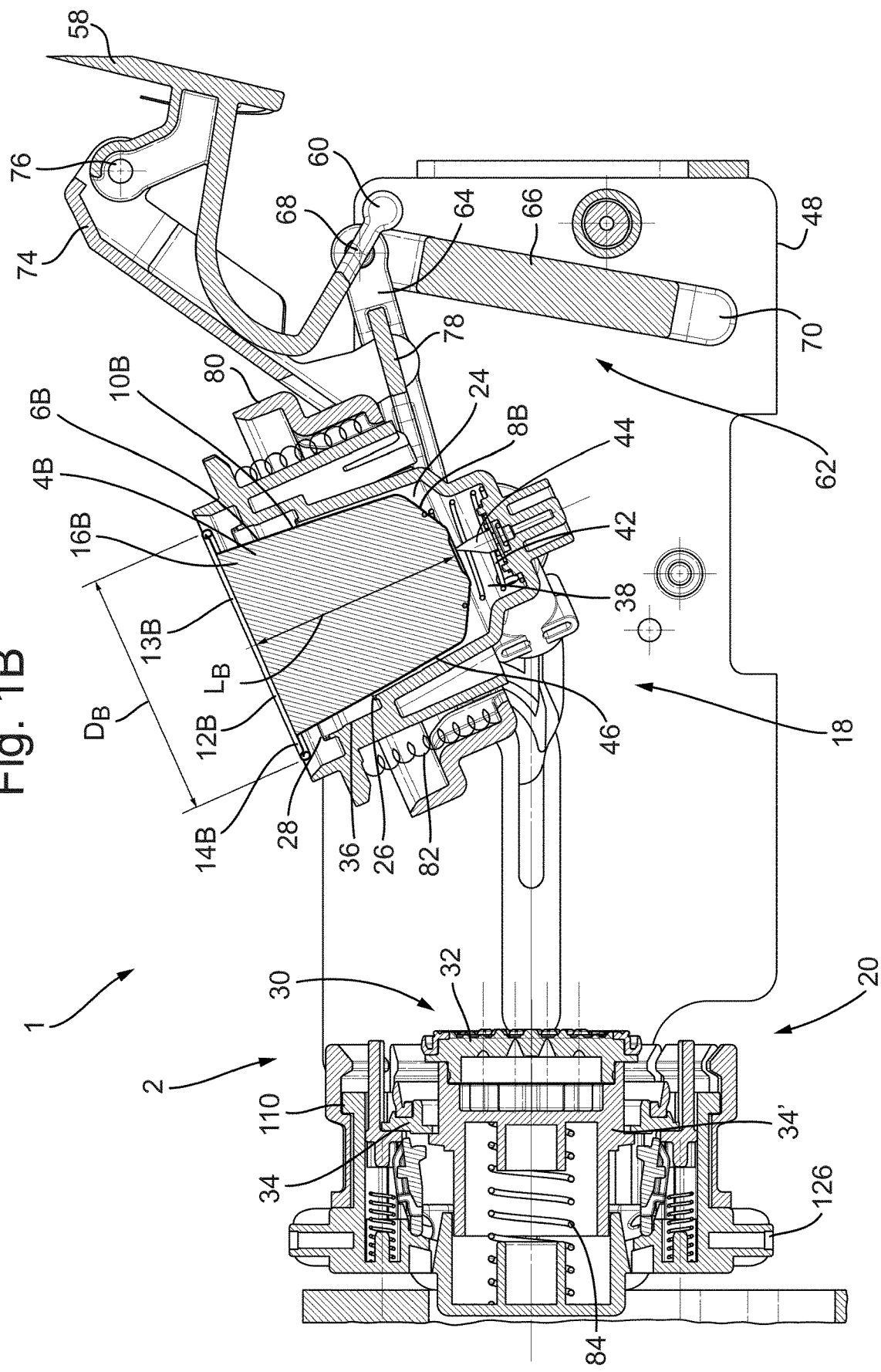
Figure 2A:
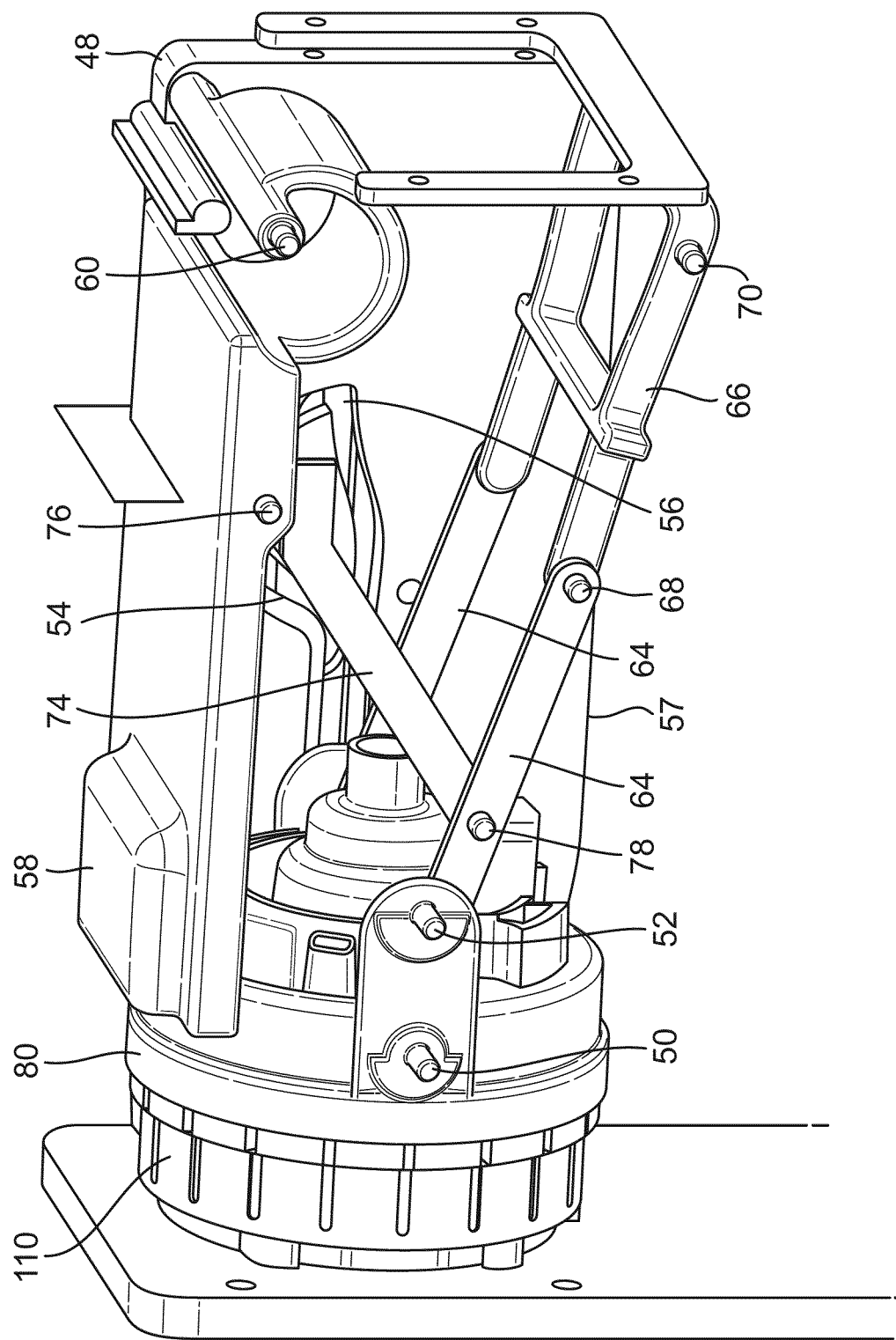

In the drawing:

FIGS. 1A and 1B show schematic representations of a system according to the invention;

FIGS. 2A and 2B show the assembly from FIGS. 1A and 1B, in a half-closed and fully closed state, respectively.

Figure 3A:
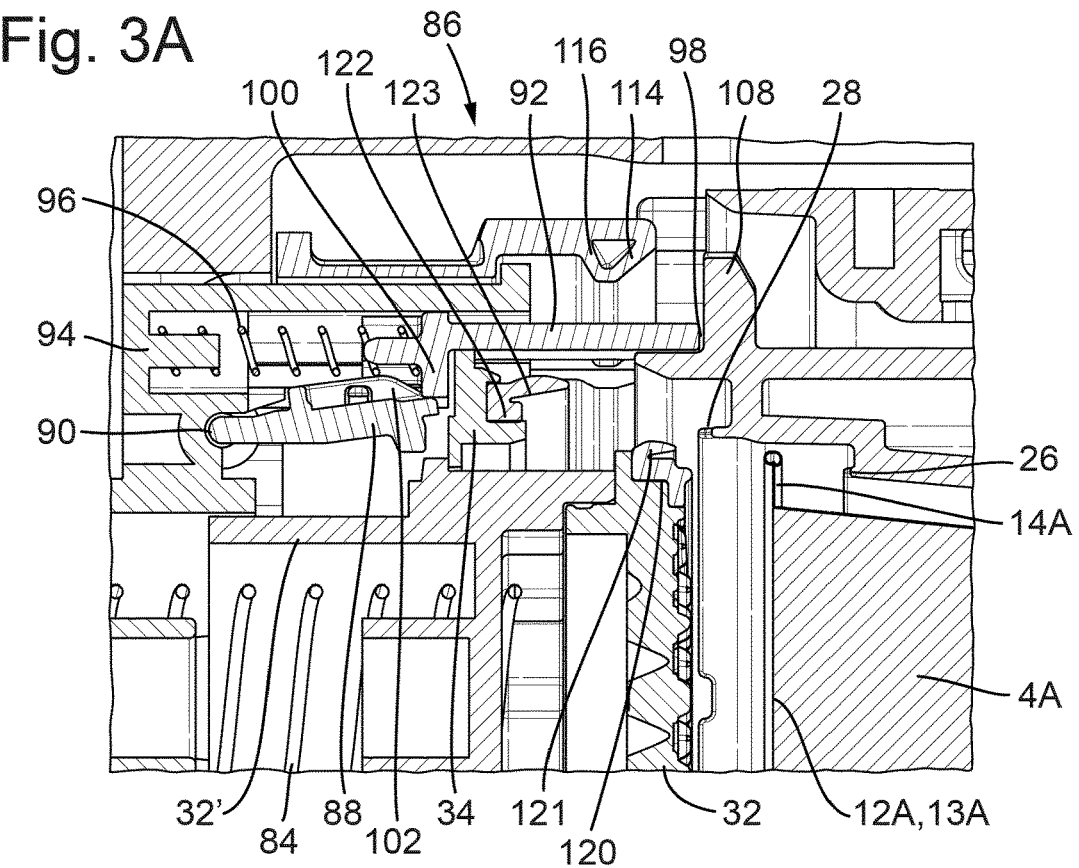
Figure 3B:
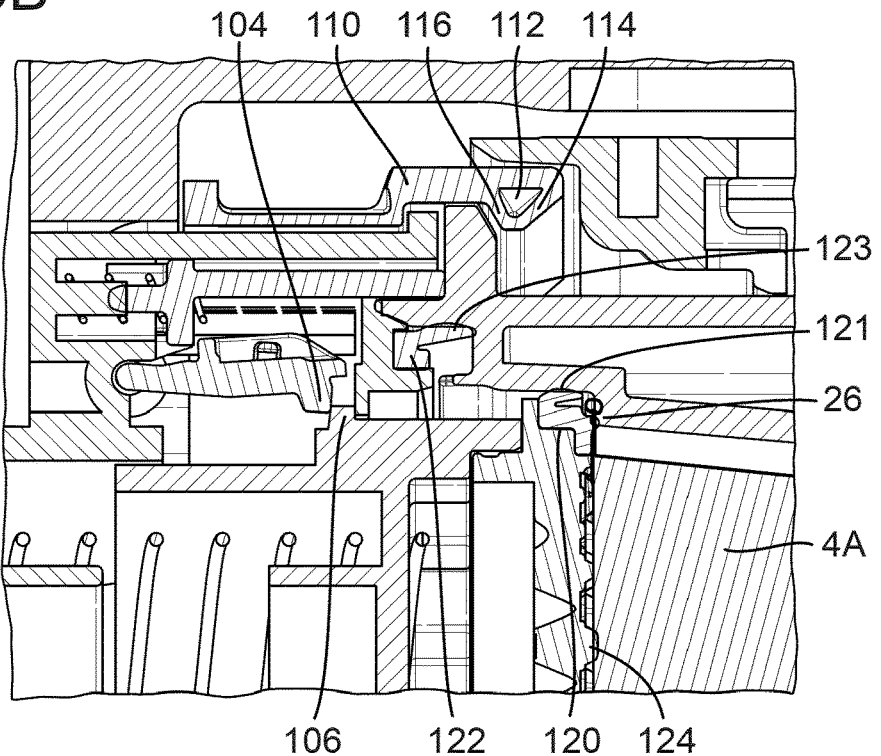
Figure 4A:
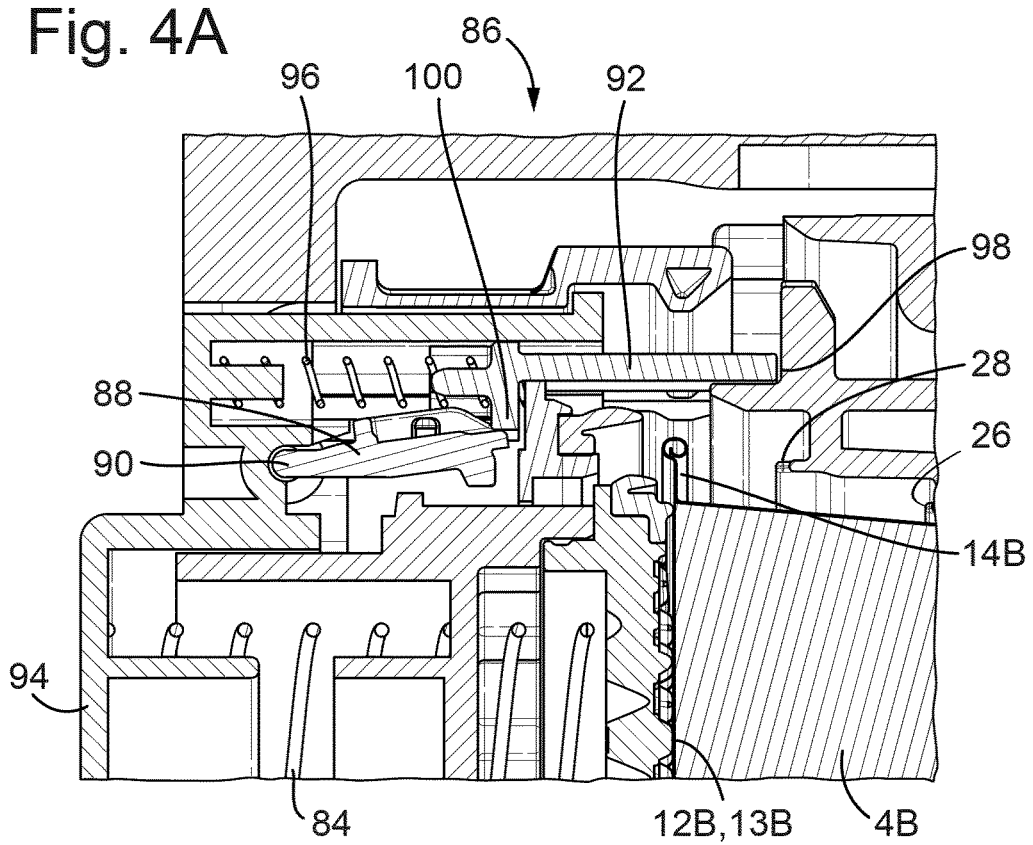
Figure 4B:
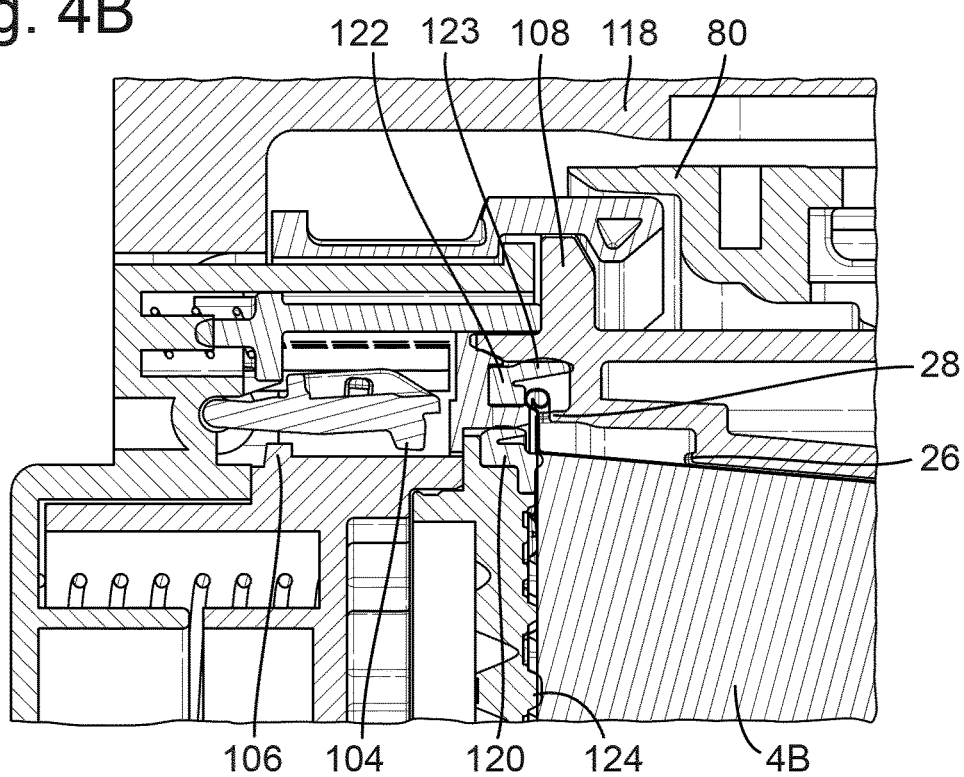
Figure 5A:
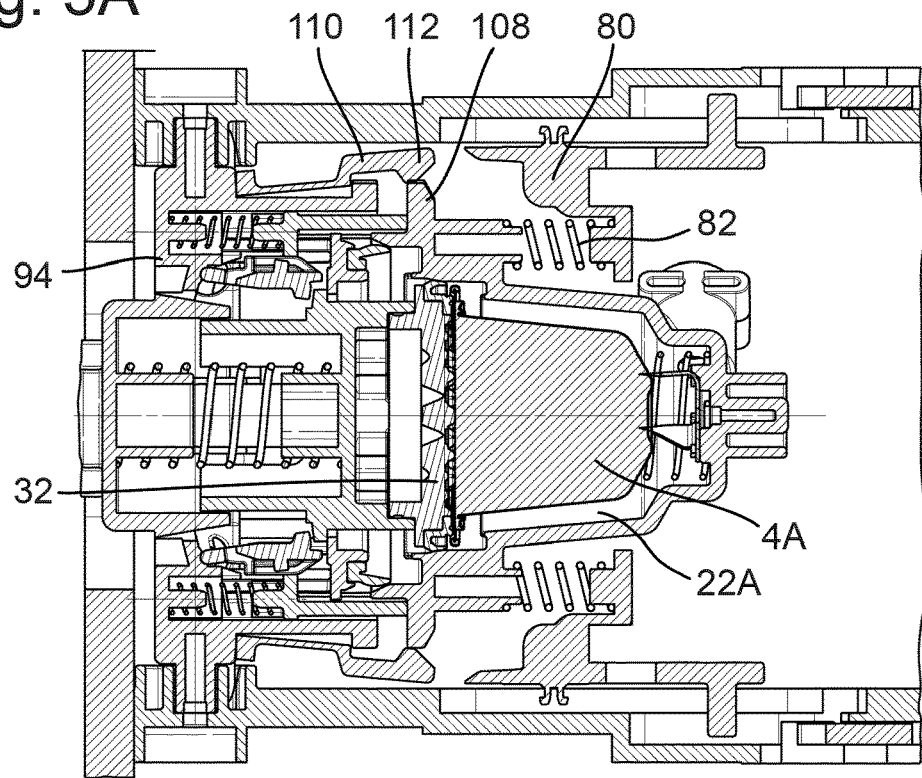
Figure 5B:
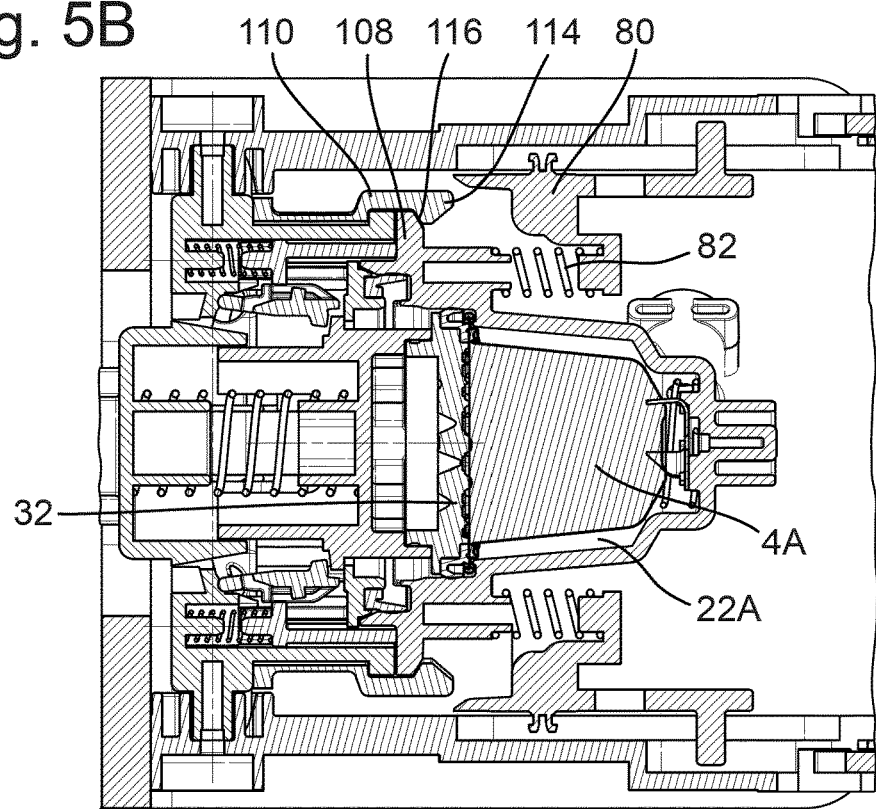
Figure 5C:
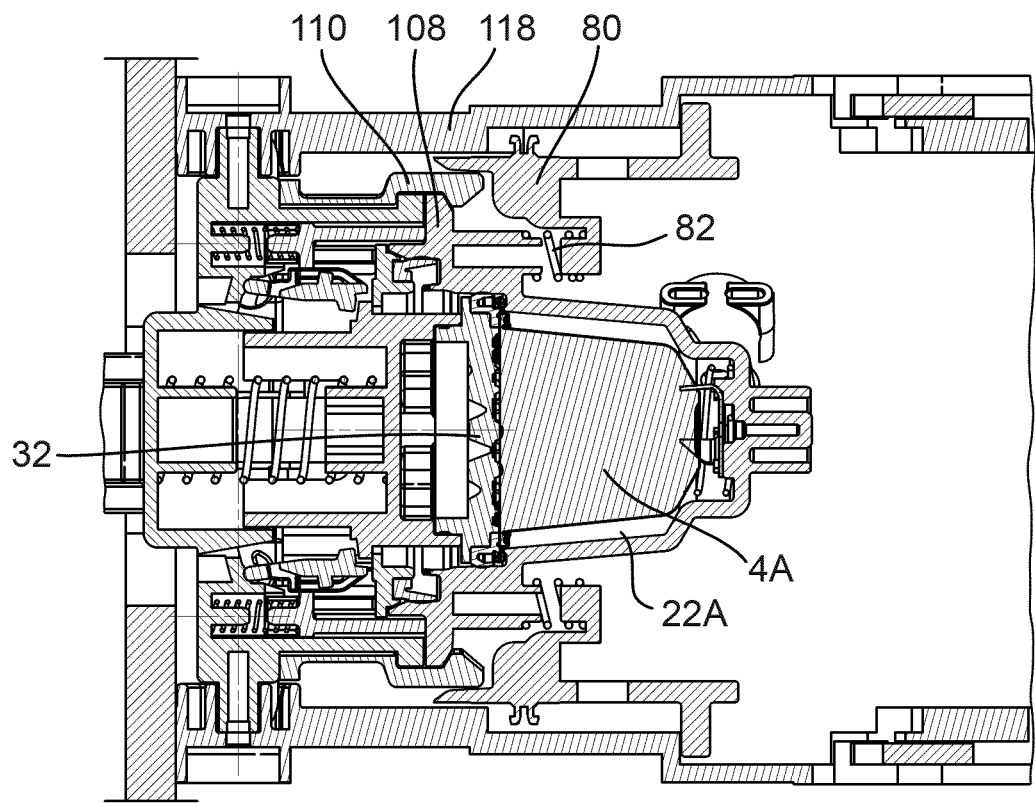
Figure 6A:
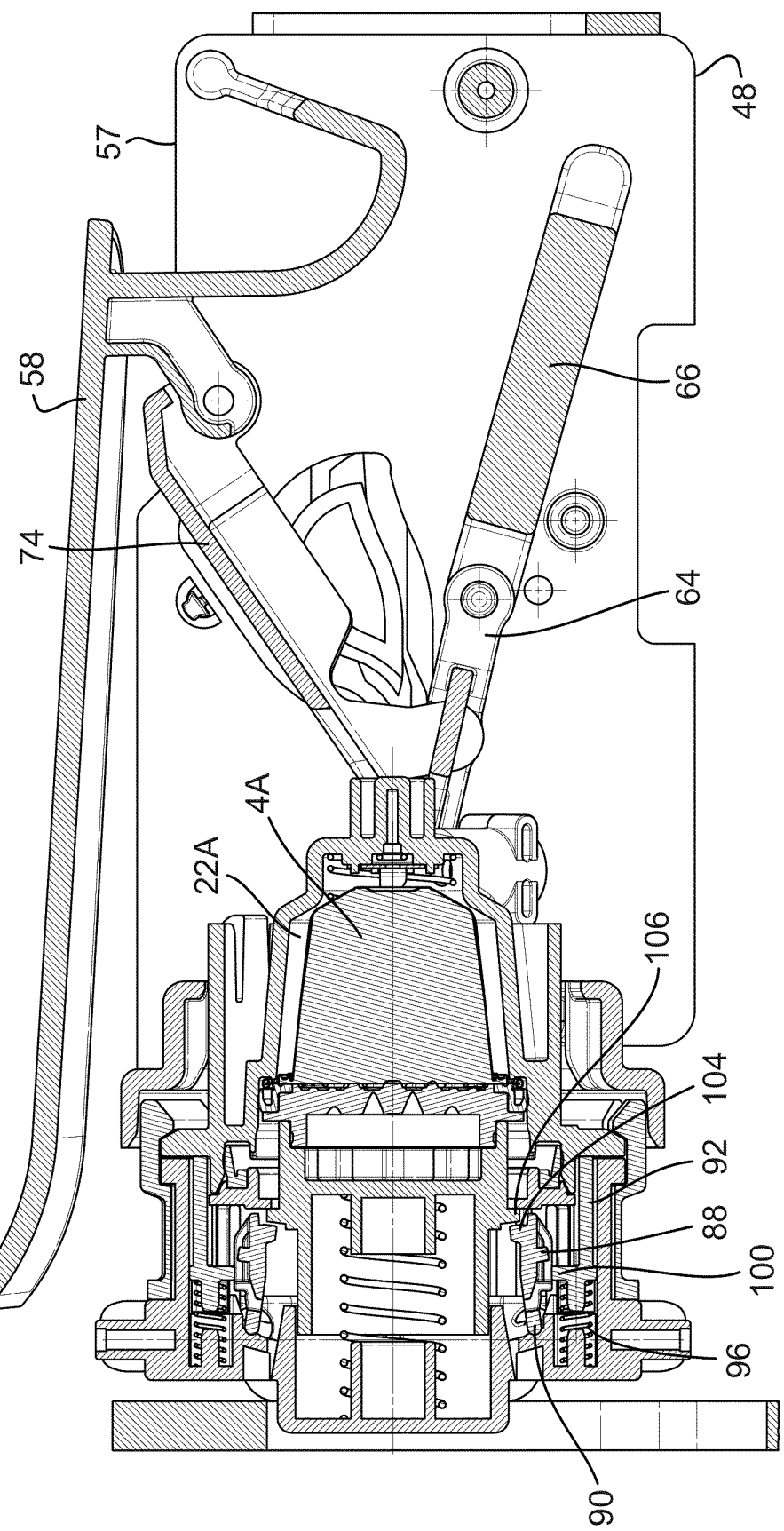
Figure 7B:
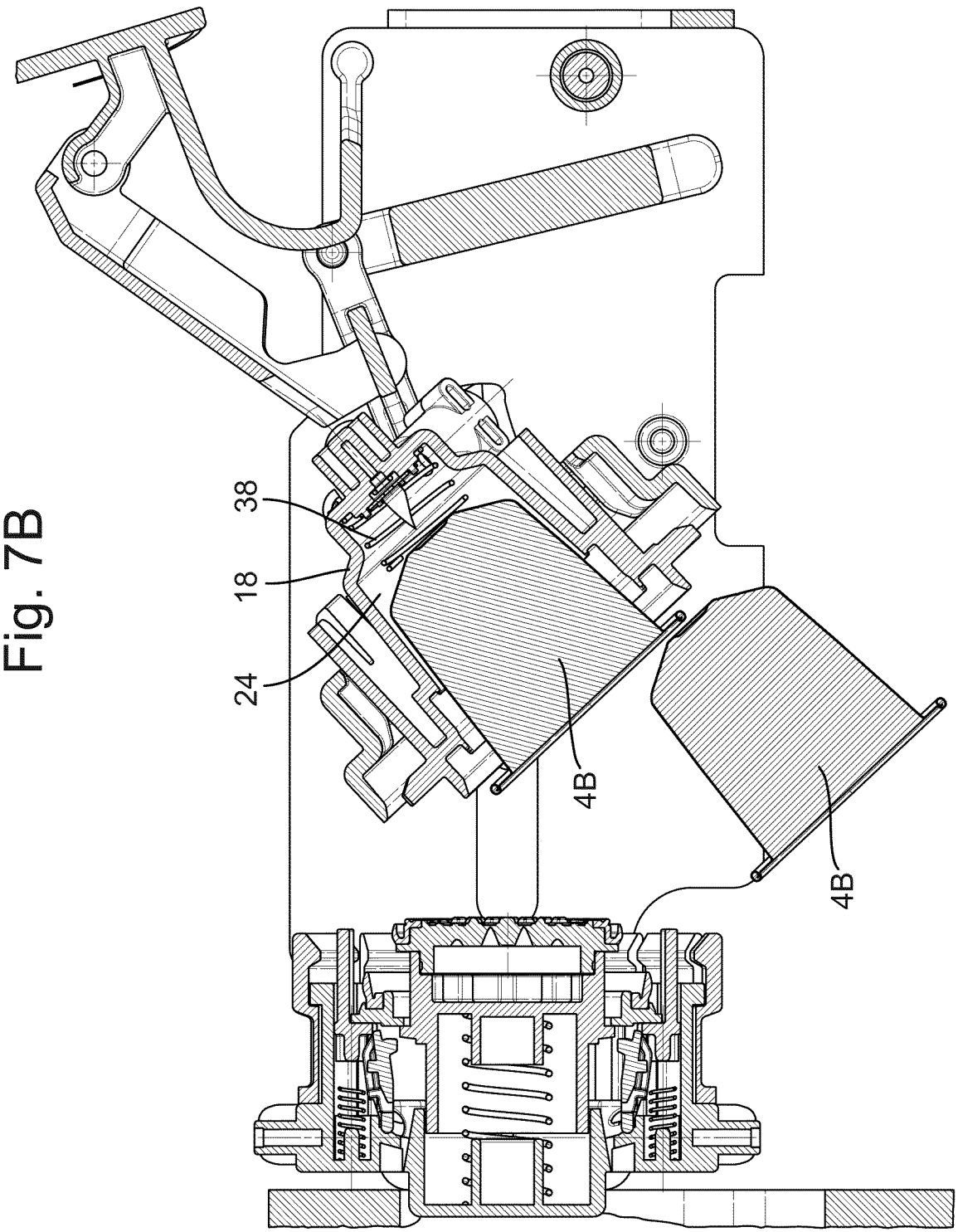
Figure 8A:
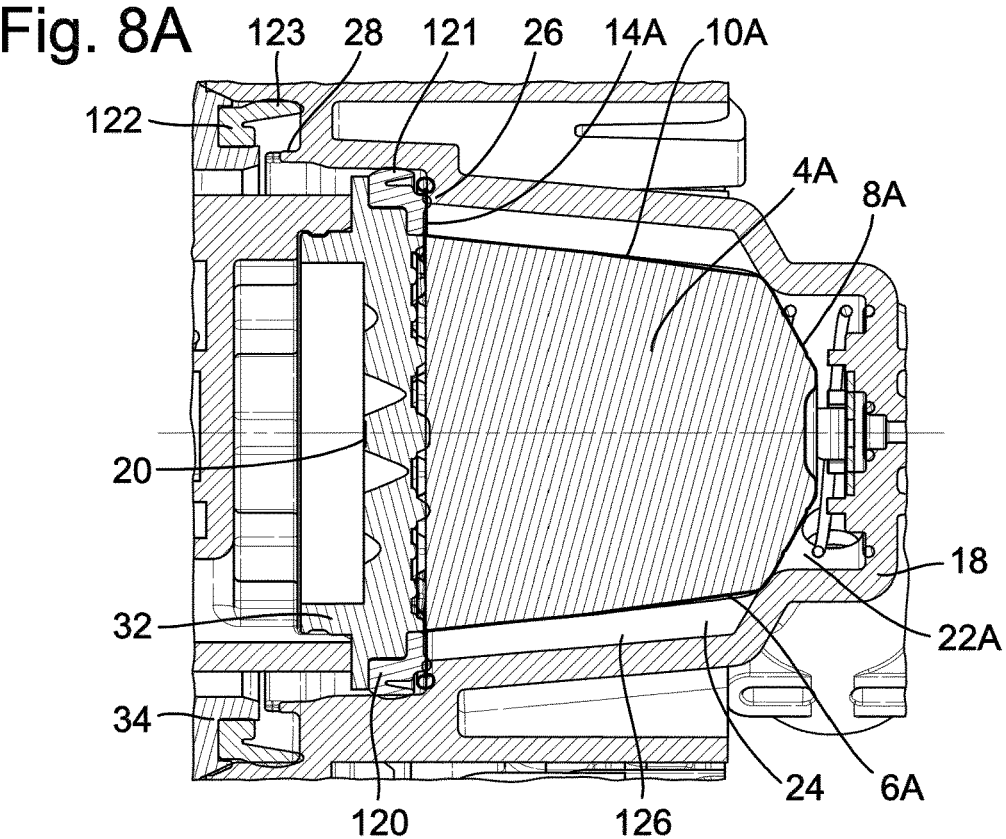
Figure 8B:
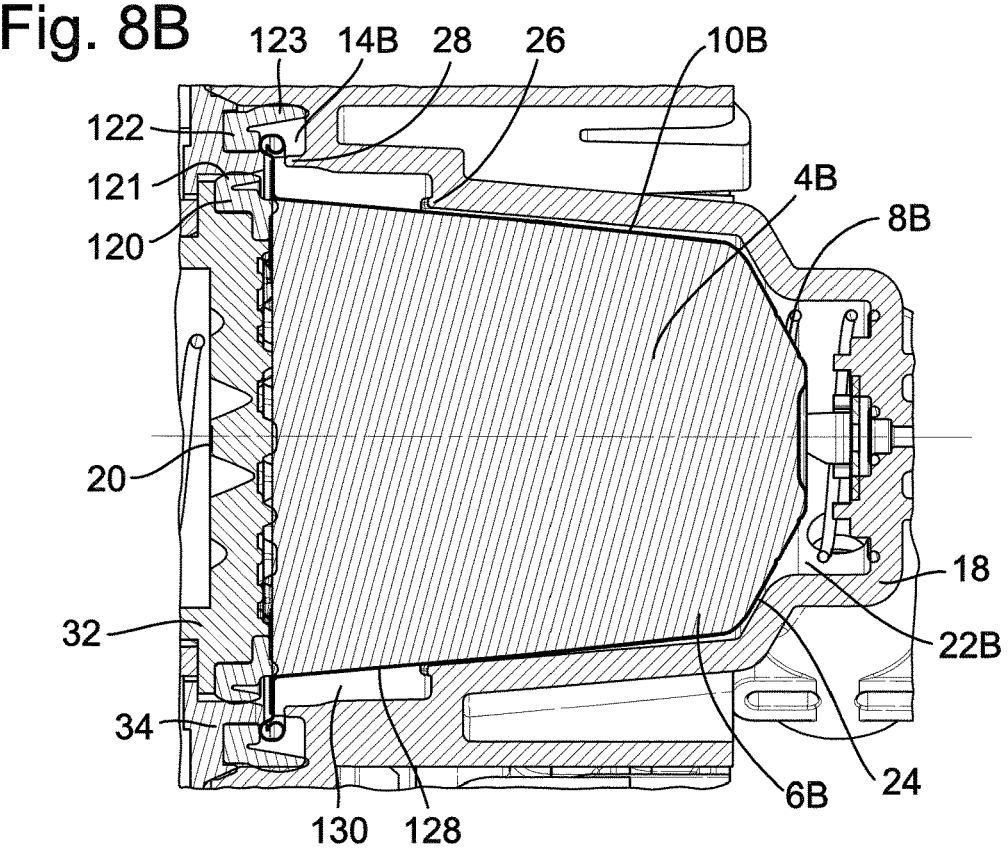
Figure 9A:
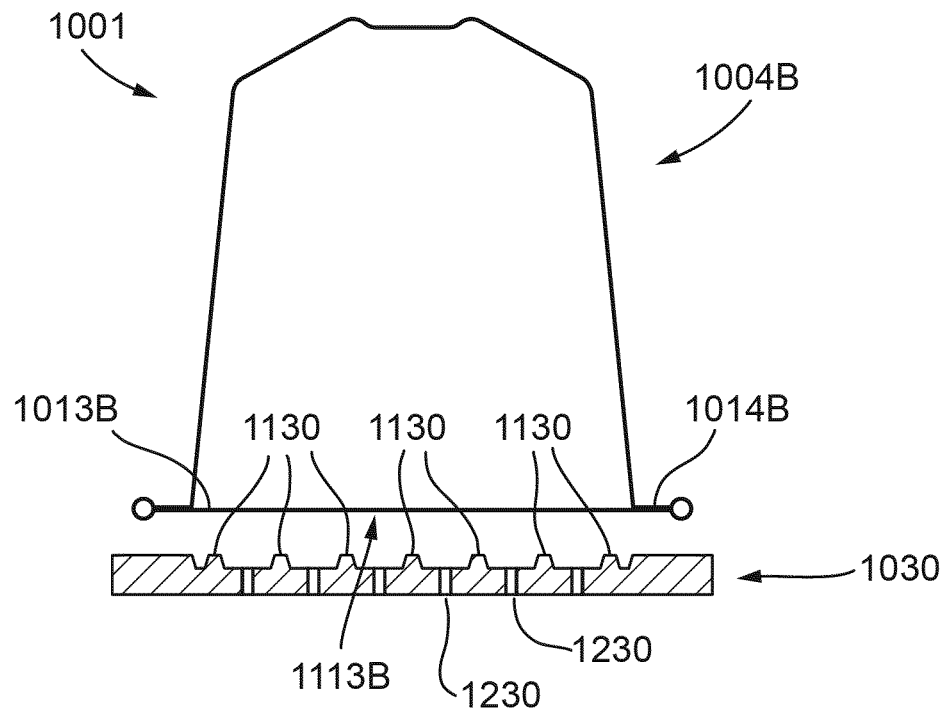
Figure 9B:
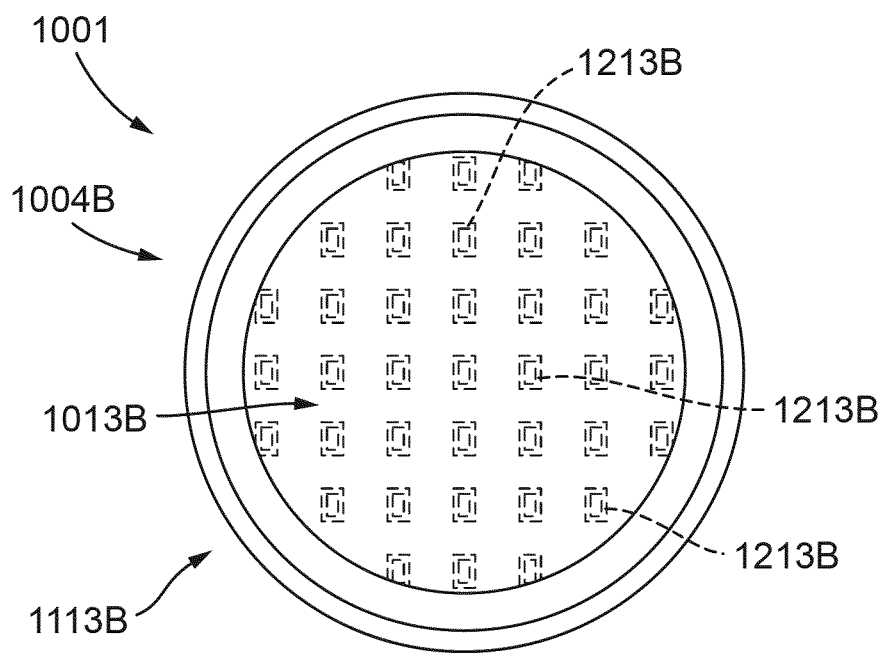
Figure 9C:
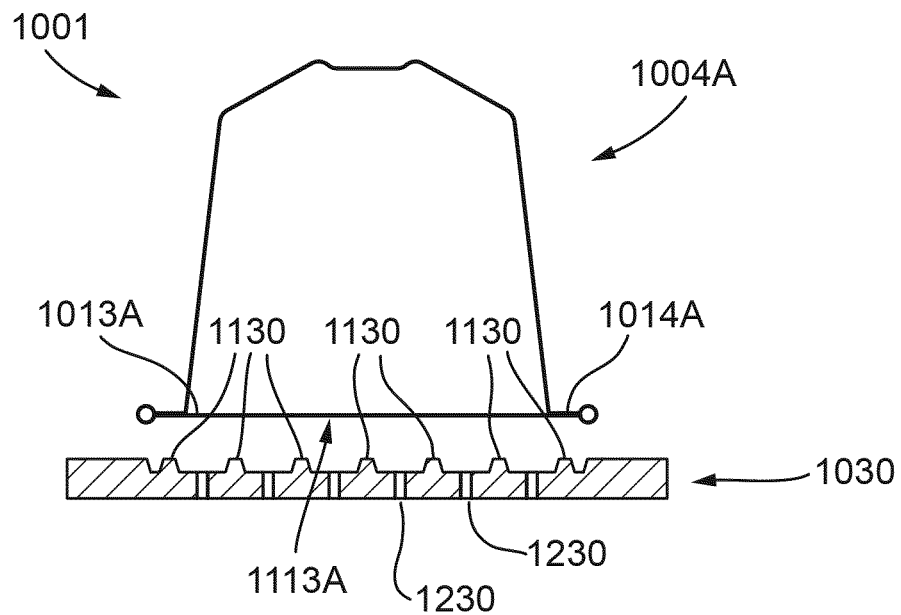
Figure 9D:
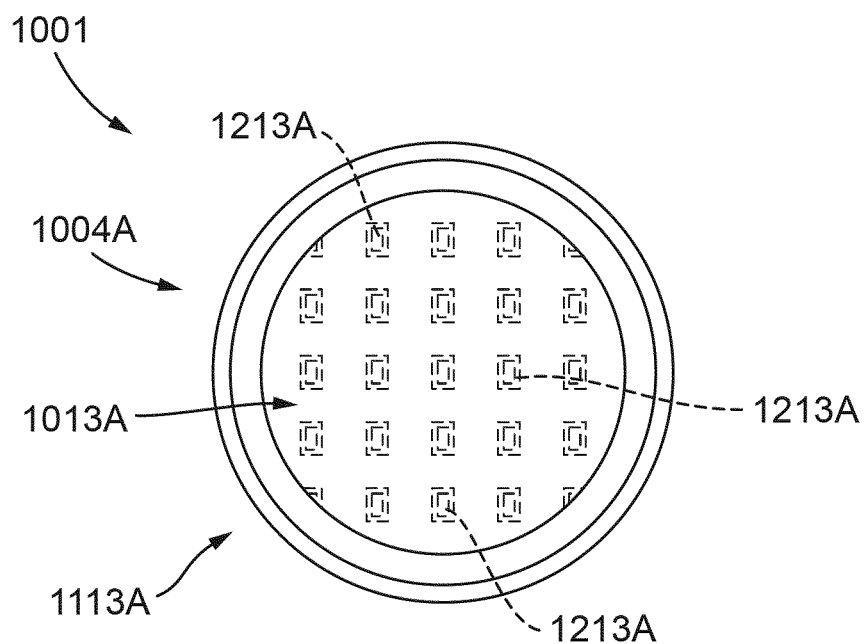
Figure 10A:
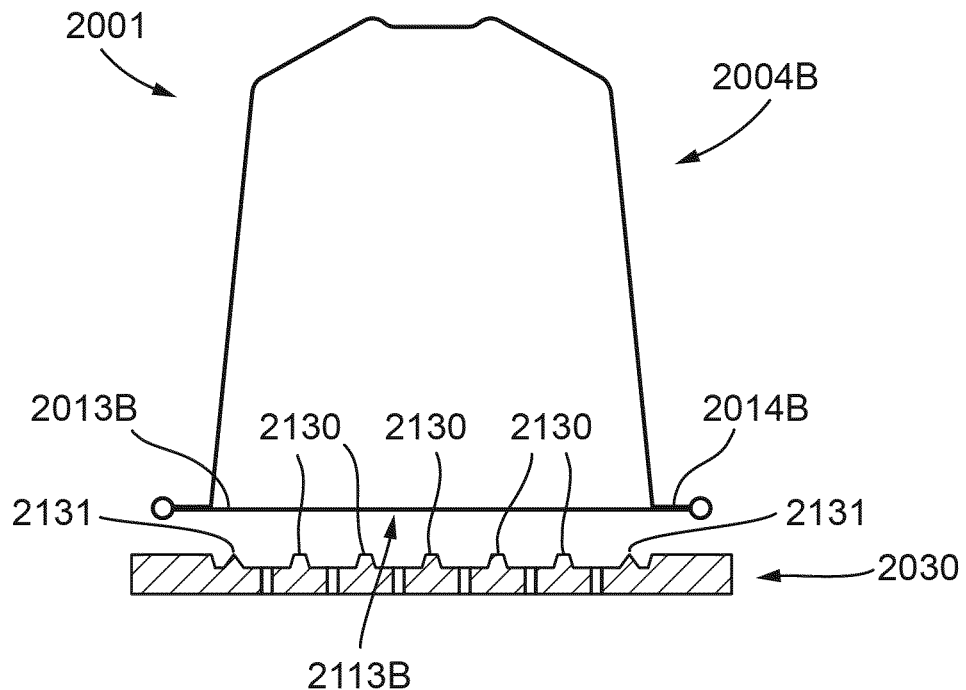
Figure 10B:
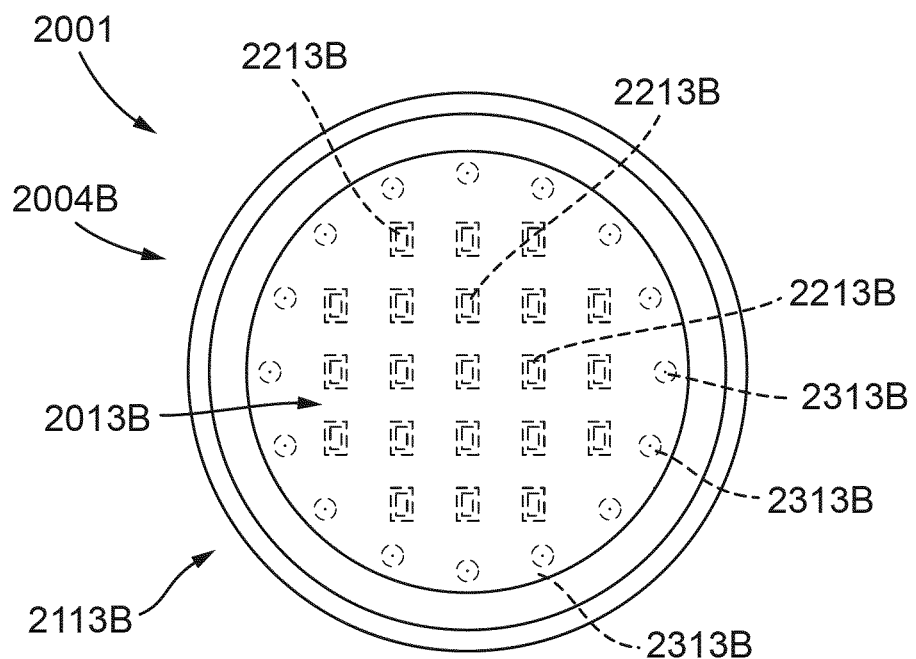
Figure 10C:
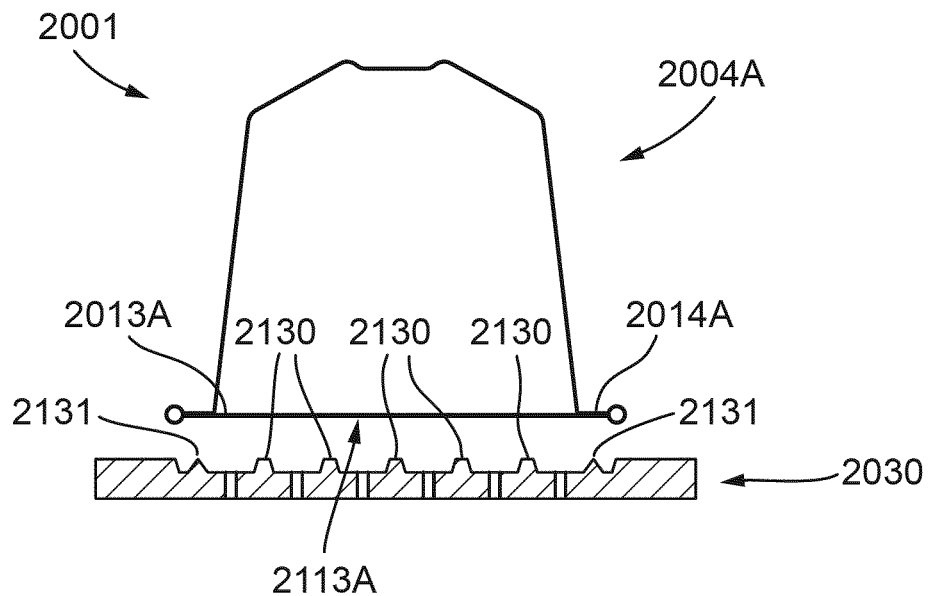
Figure 10D:
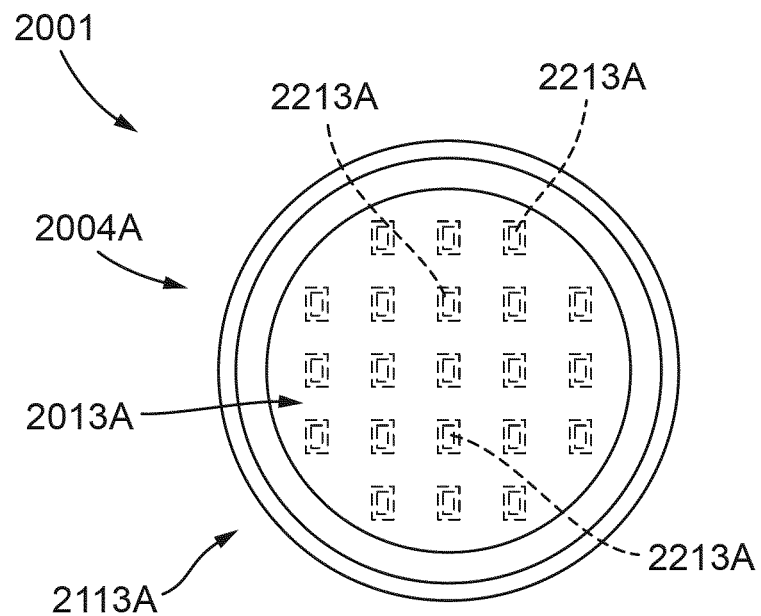
Figure 11A:
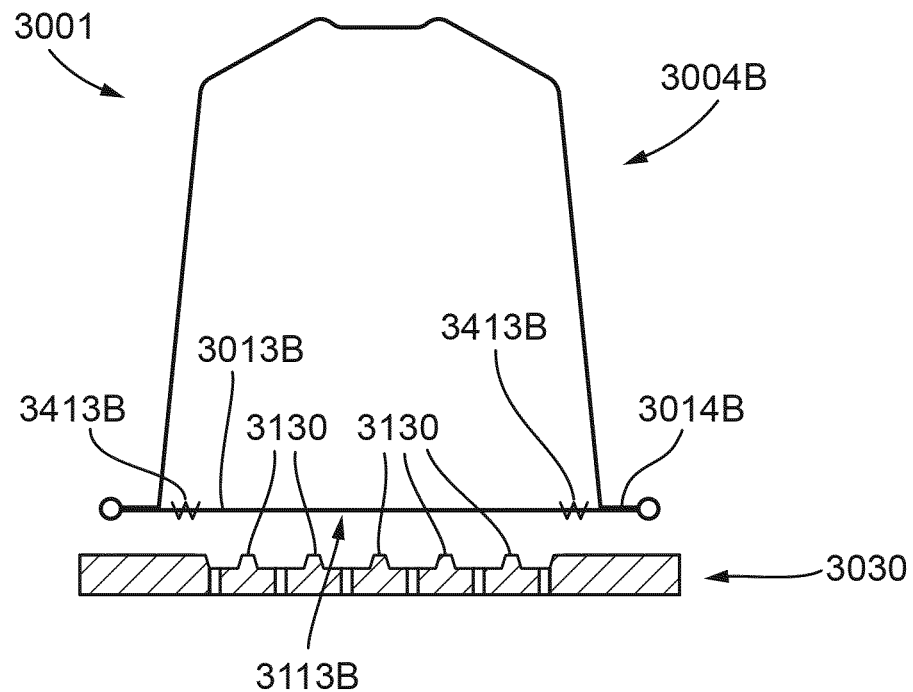
Figure 11B:
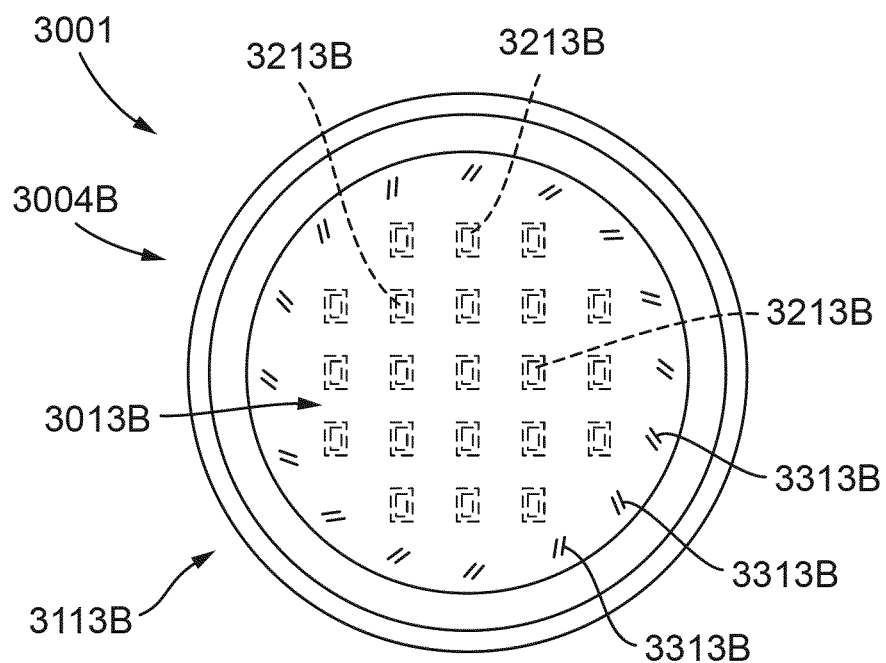
Figure 11C:
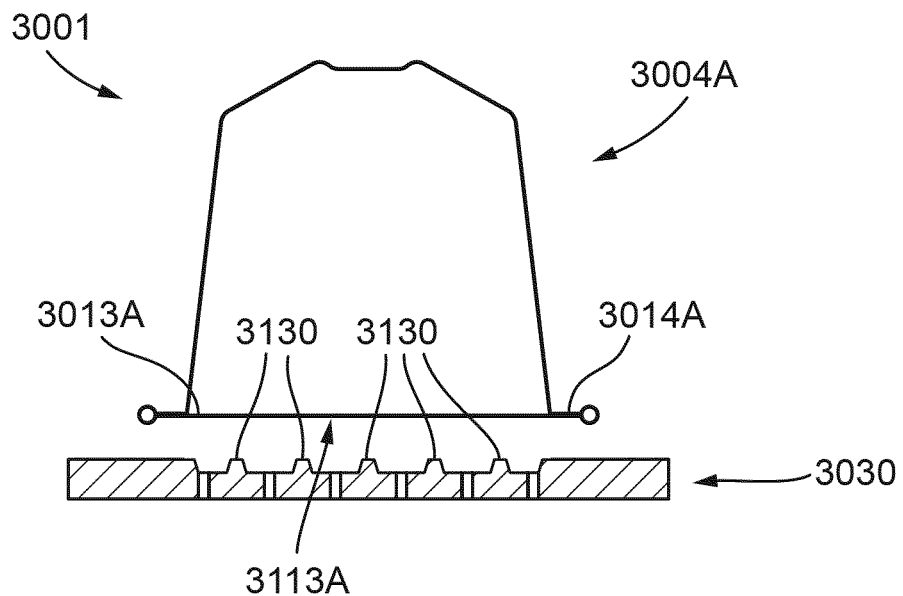
Figure 11D:
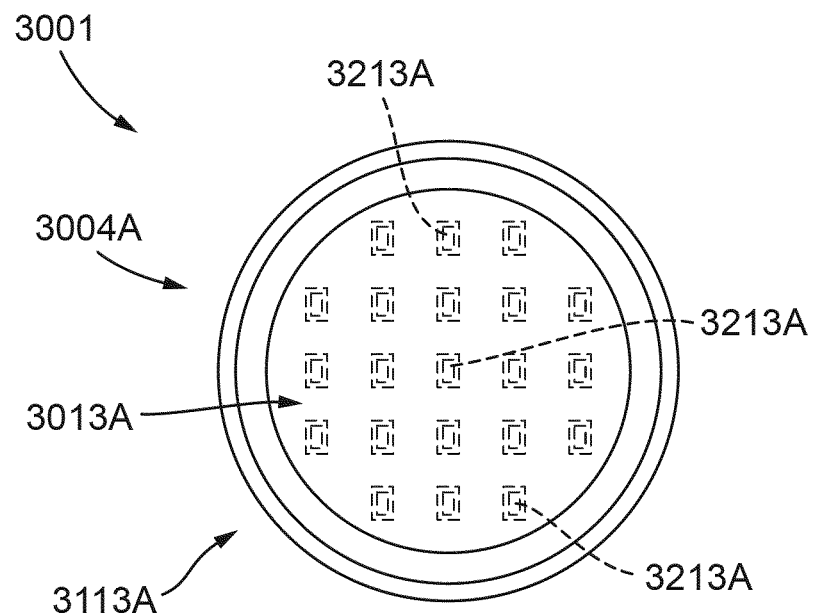
Figure 12:
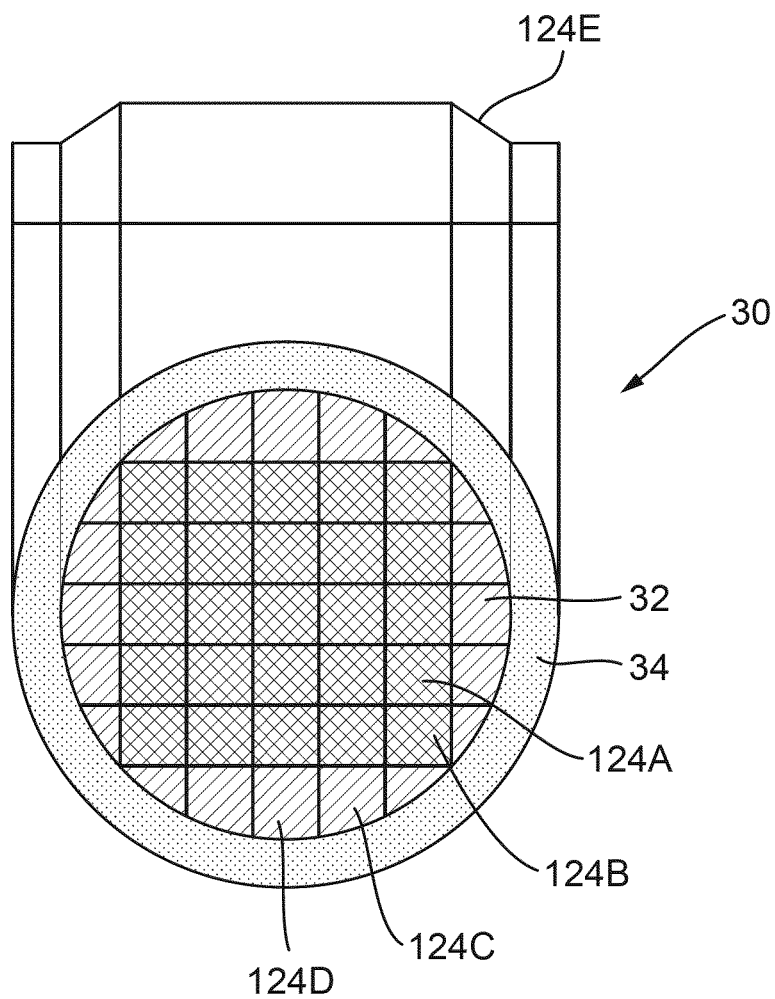

FIGS. 3A and 3B show the functioning of the locking mechanism of the system as shown in FIG. 1A when the cavity holds the first capsule;

FIGS. 4A and 4B show the functioning of the locking mechanism of the system as shown in FIG. 1B when the cavity holds the second capsule;

FIGS. 5A, 5B, and 5C show the functioning of the arresting ring of the system as shown in FIG. 1A when the cavity holds the first capsule;

FIGS. 6A and 6B show the first capsule in the brew chamber during extraction and the second capsule in the brew chamber during extraction, respectively;

FIGS. 7A and 7B show the first brew chamber part swiveled downwards for ejection of the used first and second capsule, respectively, from the cavity under the effect of gravity;

FIGS. 8A and 8B show an example of a first capsule and second capsule, respectively, inserted in the brew chamber formed by the first brew chamber part and the second brew chamber part;

FIGS. 9A, 9B, 9C, and 9D show an example of a first embodiment of a system according to the invention (hereinafter the "First system"), wherein FIG. 9A shows the extraction plate and the second capsule of the First system in cross-sectional view, FIG. 9B is a perpendicular view onto the second exit face of the second capsule in a condition after the second exit face of the second capsule has been opened by means of the extraction plate, FIG. 9C shows the extraction plate and the first capsule of the First system in cross-sectional view, and FIG. 9D is a perpendicular view onto the first exit face of the first capsule in a condition after the first exit face of the first capsule has been opened by means of the extraction plate;

FIGS. 10A, 10B, 10C, and 10D show an example of a second embodiment of a system according to the invention (hereinafter the "Second system"), wherein FIG. 10A shows the extraction plate and the second capsule of the second system in cross-sectional view, FIG. 10B is a perpendicular view onto the second exit face of the second capsule in a condition after the second exit face of the second capsule has been opened by means of the extraction plate, FIG. 10C shows the extraction plate and the first capsule of the second system in cross-sectional view, and FIG. 10D is a perpendicular view onto the first exit face of the first capsule in a condition after the first exit face of the first capsule has been opened by means of the extraction plate;

FIGS. 11A, 11B, 11C, and 11D show an example of a third embodiment of a system according to the invention (hereinafter the "Third system"), wherein FIG. 11A shows the extraction plate and the second capsule of the Third system in cross-sectional view, FIG. 11B is a perpendicular view onto the second exit face of the second capsule in a condition after the second exit face of the second capsule has been opened by means of the extraction plate, FIG. 11C shows the extraction plate and the first capsule of the Third system in cross-sectional view, and FIG. 11D is a perpendicular view onto the first exit face of the first capsule in a condition after the first exit face of the first capsule has been opened by means of the extraction plate; and FIG. 12 shows a schematic top and side view of an extraction plate.

DETAILED DESCRIPTION

As mentioned above, the principles of the invention according to the appended independent claim 1 and the appended dependent claims 2-5 are best illustrated by FIGS. 9A-9D, 10A-10D, and 11A-11D of the drawings. These figures will be discussed farther onwards in this detailed description.

As also mentioned above, the principles of the invention according to the appended dependent claims 6-12 are best illustrated by FIGS. 1A-1B, 2A-2B, 3A-3B, 4A-4B, 5A-5C, 6A-6B, 7A-7B, and 8A-8B of the drawings. These figures will now be discussed first in this detailed description.

FIGS. 1A and 1B show schematic cross sectional views of a system 1 for preparing a beverage. The system includes an apparatus 2 and an exchangeable capsule. Here the system 1 is arranged for cooperating with a first capsule 4A and a second capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B.

The first and second capsules 4A, 4B are of a different type. In this example, the second capsule 4B is larger than the first capsule 4A. An axial length LB of the second capsule 4B is larger than an axial length LA of the first capsule 4A. A diameter DB of the second capsule 4B is larger than a diameter DA of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter LA/DA of the first capsule 4A is substantially the same as a ratio of the axial length and diameter LB/DB of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A, 8B and a circumferential wall 10A, 10B. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminum foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminum foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 1A, 1B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface is positioned inside the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 22. Here the first abutment surface 26 provides the cavity 22 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface are positioned at a fixed spacing. The first abutment surface 26 and the second abutment surface are immobile relative to each other. Here, the first brew chamber part 18 includes an ejector 38. In this example the ejector 38 can include a conical ring (not shown) and/or a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as described thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38. Here the bottom 8A of the first capsule 4A centers on the ejector 38. It will be appreciated that the rim 14A of the first capsule 4A is positioned between the first abutment surface 26 and the second abutment surface 28. The bottom 8A of the first capsule 4A is not yet pierced in this state.

As shown in FIG. 1B, the second capsule 4B can also fall into the cavity 24 under the influence of gravity. Herein the circumferential wall 10B of the second capsule 4B is guided by an inner surface 46 of the first brew chamber part 18. The bottom 8B of the second capsule 4B lowers into the cavity 24 until it abuts against the ejector 38. Here the bottom 8B of the second capsule 4B centers on the ejector 38. It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion into a ready position in FIGS. 1A and 1B. The ready position is an extended position in this example. The central portion 32 can be positioned in a first brewing position for cooperating with the first capsule 4A. The central portion can be positioned in a second brewing position for cooperating with the second capsule 4B. In this example, the system 1 includes a locking mechanism 86 arranged for locking the central portion 32 in or near the first brewing position when the cavity 24 holds the first capsule 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwardly, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. This can cause the central portion to be pushed against the biasing force of the resilient member 84. The pivoted locker 88 prevents travel of the central portion beyond a position where the part 106 abuts against the thumb 104. This is herein defined as the first brewing position. Hence, the first capsule 4A is arranged for moving the central portion 32 from the ready position to the first brewing position. The first capsule 4A is held between the first and second brew chamber parts 18, 20 while brewing, wherein the central portion 32 is in the first brewing position.

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first extraction position when the cavity 24 holds the first capsule 4A. It is noted that the locking may be single-sided, viz. the locking mechanism may prevent the central portion 32 from being moved beyond the first extraction position when the cavity 24 holds the first capsule 4A. However movement of the central portion 32 from the first extraction position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14B is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further lowering of the lever 58 first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Although the functioning of the arresting ring 80 has been shown in FIGS. 5A-5C with respect to the first capsule 4A, it will be appreciated that the arresting ring 80 can function identically with respect to the second capsule 4B. FIG. 6A shows the first capsule 4A in the brew chamber during extraction. FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber for holding the first capsule 4A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber. In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber for holding the second capsule 4B. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first capsule 4A inside the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second capsule 4B inside the cavity 24.

It is noted that the first volume 126 is not occupied by the first capsule 4A when the brew chamber holds the first capsule 4A. However, this first volume 126 is occupied by part of the second capsule 4B when the brew chamber holds the second capsule 4B. The second volume 130 is not occupied by the second capsule 4B when the brew chamber holds the second capsule 4B. This second volume 130 receiving the central portion 32 of the extraction plate 30 when the brew chamber holds the first capsule 4A.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Reference is now made to FIGS. 9A-9D, which show the "First" system 1001 as an example of a first embodiment of a system according to the invention.

FIG. 9A shows the extraction plate 1030 and the second capsule 1004B of the First system 1001 in a straight cross-sectional plane, which contains the central axis of the second capsule 1004B. It is noted that, in this example, the second capsule 1004B is substantially rotational symmetric around said central axis. In FIG. 9A the plane of the extraction plate 1030 is perpendicular to said central axis. For clarity, FIG. 9A shows the extraction plate 1030 at a small distance from the second exit face 1113B of the second capsule 1004B. The relief elements of the extraction plate 1030 are indicated by the reference numeral 1130. In the shown cross-section of FIG. 9A seven relief elements 1130 are seen. The reference numeral 1230 indicates a number of beverage outlet passageways through the extraction plate 1030. The reference numerals 1013B and 1113B indicate the second exit area and the second exit face, respectively, of the second capsule 1004B. The second exit area 1013B defines the area of the second exit face 1113B through which the beverage can potentially exit the second capsule 1004B. Hence, an area of the second exit face 1113B attached to the flange-like rim 1014B of the second capsule 1004B does not constitute part of the second exit area 1013B.

FIG. 9B is a perpendicular view onto the second exit face 1113B of the second capsule 1004B in a condition after the second exit face 1113B of the second capsule 1004B has been opened by tearing on the relief elements 1130 of the extraction plate 1030. The reference numeral 1213B indicates a number of tear openings in the second exit area 1013B of the second exit face 1113B. These tear openings 1213B are the result of the second exit face 1113B having torn on the relief elements 1130 of the extraction plate 1030. Note that the tear openings in practice can be substantially U-shaped or substantially L-shaped instead of full squares as drawn.

FIGS. 9C-9D are highly similar and analogous to FIGS. 9A-9B, respectively, on the understanding that FIGS. 9C-9D show the first capsule 1004A of the First system 1001 instead of the second capsule 1004B of the First system 1001. Accordingly, where in FIGS. 9C-9D the same reference numerals are used as in FIGS. 9A-9B, but with the affixes "A" instead of "B", these corresponding reference numerals relate to similar mutually corresponding parts of the first and second capsules 1004A and 1004B. FIG. 9C shows the same extraction plate 1030 as FIG. 9A.

By comparing the situation of FIGS. 9A-9B with that of FIGS. 9C-9D, it is observed that the second exit face 1113B tears on the extraction plate 1030 over a larger surface area than the first exit face 1113A. It is also observed that the second exit face 1113B tears on the extraction plate 1030 on more locations than the first exit face 1113A. It is furthermore observed that outer ones of the relief elements 1130 are designed for tearing both the first exit face 1113A and the second exit face 1113B, wherein the second exit face 1113B tears on said outer ones of the relief elements 1130 over a larger surface area than the first exit face 1113A. This is clearly observed in FIG. 9D, in which the smaller tear openings 1213A at the four corners of the tear opening pattern in FIG. 9D are the result of only partially tearing on four specific ones of the relief elements 1130. Clearly, a number of the relief elements 1130, including the relief element 1130 shown leftmost in each of FIG. 9A and FIG. 9C as well as the relief element 1130 shown rightmost in each of FIG. 9A and FIG. 9C, do not at all result into corresponding tear openings 1213A in the first exit face 1113A of the first capsule 1004A, since in operation these specific relief elements 1130 are not engaging the first exit area 1013A of the first exit face 1113A, but are engaging an area of the first exit face 1113A attached to the flange-like rim 1014A of the first capsule 1004A.

All these observations illustrate the effectiveness, reliability and non-complexity of the specific realisations, embodied in the First system 1001 of FIGS. 9A-9D, of the general feature of the present invention that a flow resistance of the second exit face 1113B when opened is less than a flow resistance of the first exit face 1113A when opened. All these observations further illustrate what has been explained above in the general introduction of the present document. There, it has already been explained why the fact that the first exit face 1113A of the first capsule 1004A has a smaller diameter in combination with a higher flow resistance when opened, while the second exit face 1113B of the second capsule 1004B has a larger diameter in combination with a lower flow resistance when opened, enables to generally obtain improved qualities of various possible beverages preparable from not only the first capsules but also the second capsules, as compared to a situation in which a flow resistance of the opened larger-diameter second exit face of the second capsule would be the same or higher than that of the opened smaller-diameter first exit face of the first capsule. For further explanations, it is referred back to the above general introduction of the present document again.

Reference is now made to FIGS. 10A-10D, which show the "Second" system 2001 as an example of a second embodiment of a system according to the invention.

FIGS. 10A-10D are highly similar and analogous to FIGS. 9A-9D, respectively. The Second system 2001 of FIGS. 10A-10D has the first and second capsules 2004A and 2004B, which are identical to the first and second capsules 1004A and 1004B, respectively, of the First system 1001 of FIGS. 9A-9D. It is noted that, where in FIGS. 10A-10D the same reference numerals are used as in FIGS. 9A-9D, but with the integer value of such a reference numeral being increased by 1000, these corresponding reference numerals relate to similar mutually corresponding parts of the First and Second systems 1001 and 2001.

Basically, there is only one difference between the First system 1001 and the Second system 2001. That is, the Second system 2001 of FIGS. 10A-10D has an extraction plate 2030, which differs from the extraction plate 1030 of the First system 1001 of FIGS. 9A-9D in that the extraction plate 2030 includes first relief elements 2130 of a first type and second relief elements 2131 of a second type, see FIGS. 10A, 10C. The first relief elements 2130 are arranged within an area corresponding to the first exit face 2113A, and the second relief elements 2131 are arranged within an area corresponding to the second exit face 2113B and outside the area corresponding to the first exit face 2113A. Accordingly, in FIG. 10B the reference numeral 2313B indicates a number of tear openings in the second exit area 2013B of the second exit face 2113B. These tear openings 2313B are the result of the second exit face 2113B having torn on the second relief elements 2131 of the extraction plate 2030.

In the shown example, each of the first relief elements 2130 of the extraction plate 2030 of the Second system 2001 is identical to the type of relief element 1130 of the extraction plate 1030 of the First system 1001. However, the second relief elements 2131 have sharper edges than the first relief elements 2130. Thanks to this sharper edge the second exit face 2113B will tear on the second relief elements 2131 earlier than on the first relief elements 2130. In other words, the second exit face 2113B will tear earlier in its outer ranges than in its inner ranges. This contributes substantially to the aim of obtaining an extraction process being as much as possible uniformly distributed throughout the entire inner space of the second capsule 2004B, which is favourable for the quality of the prepared beverage.

Reference is now made to FIGS. 11A-11D, which show the "Third" system 3001 as an example of a third embodiment of a system according to the invention.

Just like FIGS. 10A-10D, also FIGS. 11A-11D are highly similar and analogous to FIGS. 9A-9D, respectively. The Third system 3001 of FIGS. 11A-11D has the first capsule 3004A, which is identical to the first capsule 1004A of the First system 1001 of FIGS. 9A-9D. It is noted that, where in FIGS. 11A-11D the same reference numerals are used as in FIGS. 9A-9D, but with the integer value of such a reference numeral being increased by 2000, these corresponding reference numerals relate to similar mutually corresponding parts of the First and Third systems 1001 and 3001.

Basically, there are two differences between the First system 1001 and the Third system 3001.

The first difference relates to the extraction plate. That is, the Third system 3001 of FIGS. 11A-11D has an extraction plate 3030, which differs from the extraction plate 1030 of the First system 1001 of FIGS. 9A-9D in the number of relief elements of the extraction plate. In fact, each of the relief elements 3130 of the Third system 3001 is identical to the relief element type 1130 of the First system 1001, but, as compared to the pattern of relief elements 1130 of the First system 1001, the pattern of relief elements 3130 of the Third system 3001 is lacking a number of outer peripheral ones of the relief elements. For example, the relief element 1130 shown leftmost in each of FIG. 9A and FIG. 9C as well as the relief element 1130 shown rightmost in each of FIG. 9A and FIG. 9C are not present as relief elements 3130 in each of FIG. 11A and FIG. 11C.

The second difference relates to the second capsule. That is, the Third system 3001 of FIGS. 11A-11D has a second capsule 3004B, which differs from the second capsule 1004B of the First system 1001 of FIGS. 9A-9D in that the second exit face 3113B of the second capsule 3004B includes a weakened zone 3413B, which in FIG. 11A has been depicted in a highly schematic way by means of zigzag lines. It is seen that the weakened zone 3413B is located in a peripheral area of the second exit face 3113B. Accordingly, in FIG. 11B the reference numeral 3313B indicates a number of tear openings in the second exit area 3013B of the second exit face 3113B. These tear openings 3313B are the result of the second exit face 3113B having torn at the weakened zone 3413B (indicated in FIG. 11A).

FIG. 12 shows a schematic representation of an extraction plate 30. The extraction plate 30 has the central portion 32 and the peripheral portion 34. In this example the extraction plate 30 includes a plurality of relief elements 124. Here the central portion 32 includes a plurality of relief elements of a first type 124A. Here the relief elements of the first type 124A are truncated pyramids having a substantially square base. In this example, the central portion includes twenty five relief elements of the first type 124A. Here the relief elements of the first type 124A are arranged in rows and columns, here in five rows and five columns. Hence, the relief elements of the first type 124A are arranged within a substantially square area 124B. In this example the central portion 32 includes a plurality of relief elements of a second type 124C. The relief elements of the second type 124C are positioned outside the substantially square area 124B, in substantially circle-segment shaped areas 124D. In this example, the relief elements of the second type 124C have a slanted top surface 124E. In this example, the peripheral portion 34 does not include relief elements.

In an example, the relief elements of the second type 124C are arranged to have sharper edges than the relief elements of the first type 124A. It has been found that this provides more even piercing of the exit area 13A, 13B of a capsule 4A, 4B, than when the relief elements of the second type 124C are arranged to have edges that are as sharp as the relief elements of the first type 124A. Also this aids in having the relief elements outside the substantially square area 124B piercing the exit area 13A, 13B. It will be appreciated that piercing of the exit area 13A, 13B is obtained under the effect of fluid pressure inside the capsule 4A, 4B pressing the exit area 13A, 13B against the relief elements 124A, 124C. Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape. The fourth capsule can e.g. be shaped to substantially fill the brew chamber when the central portion is in the second extraction position.

In the examples, the first capsule has an outwardly extending flange-like rim. It will be appreciated that it is possible that the first capsule does not include an outwardly extending rim. In the examples, the second capsule has an outwardly extending flange-like rim. It will be appreciated that it is possible that the second capsule does not include an outwardly extending rim.

In the examples, the capsule body and lid are made of aluminum foil, preferable polymer coated aluminum foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding etc. Suitable materials for the capsule body and/or lid include, without being limited thereto, plastic materials, in particular thermoplastic materials, for example a polyolefin polymer, for example polyethylene or polypropylene, PVC, polyesters for example polytherephtalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package, which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A system for preparing a quantity of beverage suitable for consumption, the system comprising:
    a first exchangeable capsule comprising a first exit face and a second exchangeable capsule comprising a second exit face, the second exit face having a larger diameter than the first exit face,
    an apparatus comprising:
        a first brew chamber part comprising a cavity having an invariable shape and size for selectively holding one of the first and second exchangeable capsules;

a second brew chamber part for closing the first brew chamber part around the first or second exchangeable capsule, wherein the second brew chamber part comprises an extraction plate for abutting against the first or second exit face, the extraction plate including a central portion and a peripheral portion;

wherein the peripheral portion is arranged to abut against the second exit face when the cavity holds the second exchangeable capsule while brewing, and wherein the peripheral portion is arranged to abut against the first brew chamber part when the cavity holds the first exchangeable capsule while brewing;

wherein the central portion is arranged to abut against the second exit face when the cavity holds the second exchangeable capsule while brewing, and wherein the central portion is arranged to abut against the first exit face when the cavity holds the first exchangeable capsule while brewing;

wherein the extraction plate comprises a plurality of relief elements for selectively engaging one of the first exit face of the first exchangeable capsule and the second exit face of the second exchangeable capsule.

2. The system according to claim 1, wherein the central portion is movable relative to the peripheral portion in a movement direction.

3. The system according to claim 2, wherein the central portion is arranged for, in a first position, closing against the first brew chamber part for forming a brew chamber for the first exchangeable capsule, and for, in a second position, closing against the first brew chamber part for forming a brew chamber for the second exchangeable capsule.

4. The system according to claim 1, wherein the extraction plate includes relief elements of a first type and one or more relief element of a second type.

5. The system according to claim 4, wherein the relief elements of the first type are arranged on the central portion.

6. The system according to claim 4, wherein the relief elements of the second type are arranged to surround the relief elements of the first type.

7. The system according to claim 4, wherein the relief elements of the first type are arranged within an area corresponding to the first exit face, and the one or more relief elements of the second type are arranged within an area corresponding to the second exit face and outside the area corresponding to the first exit face.

8. The system according to claim 4, wherein the relief elements of the second type have a sharper edge than the relief elements of the first type.

9. The system according to claim 1, wherein the relief elements comprise outer relief elements designed for tearing both the first and second exit face wherein the second exit face tears on the outer relief elements over a larger surface area than the first exit face.

10. The system according to claim 1, wherein the second exit face includes a weakened zone.

11. The system according to claim 10, wherein the weakened zone is located in a peripheral area of the second exit face.

12. The system according to claim 1, wherein the peripheral portion includes a sealing surface for abutting against the second exit face when the cavity holds the second capsule while brewing.

13. An apparatus for preparing a quantity of beverage suitable for consumption selectively using a first exchangeable capsule comprising a first exit face or a second exchangeable capsule comprising a second exit face, the second exit face having a larger diameter than the first exit face, the apparatus comprising:

a first brew chamber part comprising a cavity having an invariable shape and size for selectively holding one of the first and second exchangeable capsules;

a second brew chamber part for closing the first brew chamber part around the first or second exchangeable capsule, wherein the second brew chamber part comprises an extraction plate for abutting against the first or second exit face, the extraction plate including a central portion and a peripheral portion;

wherein the peripheral portion is arranged to abut against the second exit face when the cavity holds the second exchangeable capsule while brewing, and wherein the peripheral portion is arranged to abut against the first brew chamber part when the cavity holds the first exchangeable capsule while brewing;

wherein the central portion is arranged to abut against the second exit face when the cavity holds the second exchangeable capsule while brewing, and wherein the central portion is arranged to abut against the first exit face when the cavity holds the first exchangeable capsule while brewing;

wherein the extraction plate comprises a plurality of relief elements for selectively engaging one of the first exit face of the first exchangeable capsule and the second exit face of the second exchangeable capsule.

14. The system according to claim 1, wherein the extraction plate and the second exit face are adapted to each other such that the second exit face tears on the extraction plate over a larger surface area than the first exit face.

15. The system according to claim 1, wherein the extraction plate and the second exit face are adapted to each other such that the second exit face tears on the extraction plate on more locations than the first exit face.

16. The apparatus according to claim 13, wherein the extraction plate and the second exit face are adapted to each other such that the second exit face tears on the extraction plate over a larger surface area than the first exit face.

17. The apparatus according to claim 13, wherein the extraction plate and the second exit face are adapted to each other such that the second exit face tears on the extraction plate on more locations than the first exit face.

18. The system of claim 1, wherein:
the extraction plate includes relief elements of a first type and one or more relief element of a second type;
the relief elements of the first type are arranged on the central portion of the extraction plate within an area corresponding to the first exit face;
the relief elements of the second type are spaced apart from the relief elements of the first type and are located in the peripheral portion of the extraction plate within an area corresponding to the second exit face and outside the area corresponding to the first exit face; and
the relief elements of the second type have a sharper edge than the relief elements of the first type such that the relief elements of the second type pierce the second exit face before the relief elements of the first type pierce the second exit face.

* * * * *